US005497286A

United States Patent [19]

Shimada et al.

[11] Patent Number: 5,497,286

[45] Date of Patent: Mar. 5, 1996

[54] OVERLOAD PROTECTIVE APPARATUS UTILIZING A BIMETAL

[75] Inventors: Toshio Shimada; Wataru Sugawara, both of Tochigi, Japan

[73] Assignee: Hitachi, Ltd., Tokyo, Japan

[21] Appl. No.: 135,727

[22] Filed: Oct. 13, 1993

[30] Foreign Application Priority Data

| | | | |
|---|---|---|---|
| Oct. 16, 1992 | [JP] | Japan | 4-278856 |
| May 19, 1993 | [JP] | Japan | 5-117311 |

[51] Int. Cl.[6] ..... H02H 5/04; H01H 37/14

[52] U.S. Cl. ..... 361/105; 337/377; 337/102; 337/380

[58] Field of Search ..... 361/103, 105, 361/24, 26, 32, 34, 124, 163; 337/377, 89, 102, 380, 111, 112, 131, 133, 334, 365, 372, 373, 3, 4, 5

[56] References Cited

U.S. PATENT DOCUMENTS 5,235,308 8/1993 Shimada et al. ..... 337/377

*Primary Examiner*—A. D. Pellinen
*Assistant Examiner*—Michael J. Sherry
*Attorney, Agent, or Firm*—Antonelli, Terry, Stout & Kraus

[57] ABSTRACT

An overload protective apparatus has fixed contacts connected to at least one pair of fixed terminals secured on the bottom of a case, a dish-shaped polymetallic element, e.g., a bimetal or trimetal having movable contacts bonded thereon so as to oppose the fixed contacts, and an adjusting bolt supporting a central portion of the polymetallic element for maintaining the polymetallic element at a position separate from the bottom of the case, wherein the polymetallic element and the adjusting bolt are accommodated in the case. The polymetallic element used herein is constructed to make a current density around bonding portions for the movable contacts higher than other regions, such that portions around the movable contacts are more susceptible to rupture when an abnormal current flows through the polymetallic element. The polymetallic element is also constructed to prevent degradation of the spring constant thereof.

16 Claims, 28 Drawing Sheets

OVERLOAD PROTECTIVE APPARATUS UTILIZING A BIMETAL

BACKGROUND OF THE INVENTION

The present invention relates to an overload protective apparatus utilizing a bimetal for use in electric motors or the like.

Generally, a variety of products using electric motors, represented by refrigerators, air conditioners, dehumidifiers and so on, are provided with an overload protective apparatus for preventing the electric motor from being overheated and damaged. A number of propositions have conventionally been made for this type of overload protective apparatuses, examples of which may be those disclosed in JP-U-59-72641, JP-U-64-35642 and so on. Such an exemplary overload protective apparatus will be explained below with reference to FIGS. 1 and 2. FIG. 1 is a longitudinal sectional view of the example, and FIG. 2 is a plan view taken from the parting line II—II in FIG. 1. The illustrated overload protective apparatus comprises a case 1; an external bottom face 1*a*, an internal bottom face 1*b*; a lid 2; movable contacts 3, 4; a bimetal 5; an adjusting bolt 6; a head 6A of the adjusting bolt 6; fixed contacts 7, 8; fixed terminals 9, 10; a heater terminal 11; a heater line 12; and a spring 13.

In FIG. 1, the case 1 is made of a heat resistant material such as synthetic resin including phenol resin, unsaturated polyester and so on, and is formed in a cylindrical shape having a basal plane. The case 1 is covered with the lid 2 so that an internal space is formed thereby.

In the internal space, the adjusting bolt 6 made of brass is mounted in substantially the center of the bottom of the case 1 in a manner that it penetrates the bottom wall from the internal bottom face 1*b* to the external bottom face 1*a*. The adjusting bolt 6 has the head 6*a* at the extreme end thereof inside the case 1. The bimetal 5 in an arcuate dish shape is mounted to the adjusting bolt 6 which penetrates a supporting hole formed through the bimetal 5. The spring 13 is interposed between the bimetal 5 and the internal bottom face 1*b* of the case 1 such that the bimetal 5 is urged toward the head 6*a* of the adjusting bolt 6 by an urging force of the spring 13, whereby the bimetal 5 is spaced apart from the bottom of the case 1.

The bimetal is arcuate, and the pair of movable contacts 3, 4 are secured thereon by resistance welding symmetrically about the supporting hole.

The fixed contact 7 is secured at the tip of the fixed terminal 9 which penetrates the bottom wall of the case 1 from the internal bottom face 1*b* to the external bottom face 1*a* and is fixed on the internal bottom face 1*b*. This fixed contact 7 is positioned on the internal bottom face 1*b* opposite to one of the movable contacts indicated by 3 on the bimetal 5. Similarly, the fixed contact 8 is secured at the tip of the fixed contact 10 which is likewise fixed on the internal bottom face 1*b* and outwardly projects through the bottom wall. The fixed contact 8 is positioned on the internal bottom face 1*b* opposite to the other movable contact 4 on the bimetal 5.

Further, the heater terminal 11 is likewise secured on the internal bottom face 1*b* of the case 1, with a part thereof being projecting outwardly through the bottom wall of the case 1. Then, the heater line 12 is connected between the heater terminal 11 and the fixed terminal 9 by welding or the like. The fixed terminal 10 and the heater terminal 11 serve as external terminals of the overload protective apparatus.

The heater line 12 is disposed close to the lower surface of the bimetal 5 such that it surrounds the adjusting bolt 6, whereby the whole bimetal 5 is heated by heat generated by the heater line 12.

The bimetal 5 is formed in a circular arc, the center of which is located in a central portion thereof. Specifically, when its temperature is low, it is curved with the central portion thereof projecting upwardly, as illustrated, so that the movable contacts 3, 4 are kept in contact with the fixed contacts 7, 8, respectively. Thus, a current path is formed from the fixed terminal 10 to the heater terminal 11 through the fixed contact 8, movable contact 4, bimetal 5, movable contact 3, fixed contact 7, fixed terminal 9 and heater line 12. As the bimetal 5 is heated and reaches a predetermined temperature, it suddenly changes its shape to an arcuate state with the central portion thereof projecting downwardly, i.e., reverse to the illustrated state. This sudden change in shape will hereinafter be called "the reverse motion" and the state of the bimetal 5 after the reverse motion will be called "the reverse state". Also, a temperature at which this reverse motion occurs will be called "the reverse motion temperature". When the bimetal 5 performs the reverse motion, the movable contacts 3, 4 are detached from the fixed contacts 7, 8, respectively, to break the current path.

When the temperature of the bimetal 5 begins falling due to the bimetal 5 being in the reverse state, and reaches a certain temperature, the bimetal 5 is restored to the initial state as illustrated. This motion will hereinafter be called "the restoring motion", and the illustrated state will be called "the original state". Also, a temperature at which the restoring motion occurs is called "the restoring motion temperature". When the bimetal 5 is restored from the reverse state to the original state, the movable contacts 3, 4 are again brought into contact with the fixed contacts 7, 8, respectively to restitute the current path.

FIG. 3 is a connection diagram showing an electric circuit when the foregoing overload protective apparatus is employed in an electric motor. The circuit includes an overload protective apparatus 14 as described above; an electric motor 15; a starter 16; a starting winding 17; and a main winding 18. Parts corresponding to those shown in FIGS. 1 and 2 are designated the same reference numerals.

As can be seen, FIG. 3 only shows a current path constituting portion in the overload protective apparatus 14 and the windings 17, 18 of the electric motor 15. The electric motor 15 has a series circuit formed by the starting winding 17 and the starter 16 connected in parallel with the main winding 18. The electric motor 15 is serially connected with the overload protective apparatus 14 by connecting one terminal of the electric motor 15 with the heater terminal 11 of the overload protective apparatus 14, whereby a current flows through the starting winding 17 and the main winding 18 of the electric motor 15 through the fixed terminal 10, bimetal 5, heater line 14 and heater terminal 11 of the overload protective apparatus 14.

In operation of the electric motor 15, if the electric motor 15 is mechanically locked by burning of a bearing portion in the electric motor 15 or a compressor, not shown, driven by the electric motor 15, invasion of contaminants or the like into rotating portions of the compressor, the rotor of the electric motor 15 is hindered from rotating, so that a large current corresponding to a starting current keeps flowing through the electric motor 15. This large current keeps flowing as long as the power supply is connected and the rotor remains locked. This large current is called "a constraint current" and amounts to four–five times a rated current of the electric motor 15. Normally, since the starting current flows only for a short period of 2–3 seconds (starting period) in a regular starting operation, the electric motor 15 is designed to be sufficiently resistant to a current of this magnitude flowing for such a short period of time. However, the electric motor 15 is not designed in consideration of the constraint current which keeps flowing through the electric motor 15 and current circuits associated therewith for a long period of time, so that such a state, not contemplated, is of course not preferable.

When a large constraint current flows through the electric motor 15, self-heating amounts of the bimetal 5 and the heater line 12 increase. Then, when the temperature reaches a reverse motion temperature of the bimetal 5, the bimetal 5 suddenly performs a reverse motion at that moment, whereby the movable contacts 3, 4 are detached from the fixed contacts 7, 8, respectively, resulting in breaking a current to the electric motor 15. If this breakage of the current takes place, the bimetal 5 and the heater line 12 begin to cool down. Afterward, when the temperature reaches the restoring motion temperature of the bimetal 5, the bimetal 5 suddenly performs a restoring motion to be restored to the original state, whereby the movable contacts 3, 4 are again brought into contact with the fixed contacts 7, 8, respectively, resulting in resuming applying a current to the electric motor 15.

At the time the electric motor 15 is again applied with a current, if the electric motor 15 has been released from a constraint state, the electric motor 15 performs a normal operation without the bimetal 5 again performing the reverse motion.

Next, another example of prior art overload protective apparatuses, as described in JP-U-60-183349 and so on, will be explained with reference to FIG. 4. Note that parts in FIG. 4 corresponding to those in FIG. 1 are designated the same reference numerals.

The illustrated prior art example basically differs from the example shown in FIG. 1 in that no heater line is provided in the former. For this reason, as shown in FIG. 4, a fixed terminal 9 having a fixed contact 7 at the tip thereof outwardly projects through a bottom wall of a case 1. Another fixed terminal 10 similarly projects outwardly, and these fixed terminals 9, 10 serve as external terminals of the overload protective apparatus. When movable contacts 3, 4 are in contact with fixed contacts 7, 8, a current path is formed from the fixed terminal 10 to the fixed terminal 9 through the movable contact 8, bimetal 5, movable contact 3 and fixed contact 7.

For employing the overload protective apparatus constructed as described above in an electric motor 15, one of the fixed terminals indicated by 9 of the overload protective apparatus 14 is connected to one terminal of the electric motor 15, as shown in FIG. 5.

If a large constraint current flows through the electric motor 15 due to a certain failure occurring therein, self-heating of the bimetal 5 increases. When the temperature reaches a reverse motion temperature of the bimetal 5, the bimetal 5 suddenly performs a reverse motion at that moment, whereby the movable contacts 3, 4 are detached from the fixed contacts 7, 8, thus breaking a current to the electric motor 15. When the breakage of the current takes place, the bimetal 5 begins cooling down. Then, when the temperature reaches a restoring motion temperature of the bimetal 5, the bimetal 5 suddenly performs a restoring motion to be restored to an original state, whereby the movable contacts 3, 4 are brought into contact with the fixed contacts 7, 8, respectively, resulting in resuming application of a current to the electric motor 15.

At the time the electric motor 15 is again applied with a current, if the electric motor 15 has been released from a constraint state, the electric motor 15 performs a normal operation without the bimetal 5 again presenting the reverse motion.

As described above, according to the respective prior art examples, if the electric motor 15 is released from a constraint state while the bimetal 5 remains in the reverse state, the electric motor 15 will resume a normal operation, thus preventing the electric motor 15 from being overheated and damaged.

However, if an abnormal state of the electric motor 15 has not been solved, and the electric motor 15 still remains in a constraint state when the bimetal 5 has performed the restoring motion to be restored to the original state, a large constraint current again flows into the overload protective apparatus 14, causing the bimetal 5 to again perform the reverse motion to get into the reverse state, thereby breaking a current to the electric motor 15.

As described above, as long as the abnormal state of the electric motor 15 is not solved, the bimetal 5 alternately repeats the reverse motion and restoring motion. When these operations are repeated a great number of times, the bimetal 5 will be gradually fatigued and finally broken. The aforementioned JP-U-60-183349 employs, as the bimetal 5, a member which is formed with a plurality of slits 5c extending radially from a supporting hole 5b into which an adjusting bolt 6 is inserted, as shown in FIG. 6. If the bimetal 5 as illustrated repeats a reverse motion and a restoring motion as described above, breaks E, F as illustrated will run from two end portions of the slits 5c.

It should be noted that the plane shape of the bimetal 5 shown in FIG. 6 is such that rectangular end faces 5a, 5a' project from two opposite locations on the outer periphery 5d of a region formed substantially in a circular or elliptic shape. The movable contacts 3, 4 are secured by resistance welding at positions symmetric about the supporting hole 5b near the end faces 5a, 5a'.

In an overload protective apparatus for turning a large current on and off, since large movable contacts 3, 4 are employed suitable for the magnitude of the current, few freedom is ensured during the reverse motion for portions of the bimetal 5 for coupling the movable contacts 3, 4 thereto, whereby stress in these portions will increase. For this reason, breaks may advance simultaneously from surroundings of the movable contacts 3, 4.

If the bimetal 5 is broken as described above, the characteristics of the bimetal 5 will change to cause decreases in pressures against the contacts and a contact separating force as well as changes in the reverse motion temperature and restoring motion temperature, with the results that, even if the bimetal 5 performs the reverse motion, time intervals between the reverse motions become shorter due to some causes such as a decreased displacement amount of portions of the bimetal 5 for coupling the movable contacts 3, 4 by the reverse motion of the bimetal 5, whereby a conductive ratio of the constraint current flowing through the bimetal 5 and the heater line 12 is increased to cause the temperature inside the case 1 to rise more and more.

A final failure caused by such repetitive motions is contact deposition between the movable contacts 3, 4 and the fixed contacts 7, 8. If the contact deposition occurs in this manner, a large constraint current will continuously flow through the windings of the electric motor 15 and the bimetal 5 of the overload protective apparatus 14, causing the windings of the electric motor 15 to be heated and damaged, or the temperature inside the case 1 to rise due to heated bimetal 5 and heater line 12. If a resultant temperature inside the case 1 exceeds a resistible temperature of the case 1 and the lid 2, this will result in also burning or damaging members near the bimetal 5 such as the case 1, the lid 2 and so on.

Incidentally, in the prior art example shown in FIG. 1, if the heater line 12 is cut by an abnormally rising temperature inside the case 1, the current path of the overload protective apparatus 14 is also broken, so that the above-stated burn and damage can be prevented, thus ensuring the security. However, the heater line 12 is not always cut every time the temperature inside the case 1 becomes abnormally high. Thus, the heater line 12, not cut in such a situation, will cause a problem on the security. With the overload protective apparatus 14 as shown in FIG. 4, which does not even have a heater line, this action cannot even be expected.

Generally, a fusing current of a bimetal in an overload protective apparatus for use in a refrigerator is 70 amperes or more for five seconds of conduction. On the other hand, that for use in an air conditioner and so on is 100 amperes or more. These values indicate that the bimetal will not be ruptured unless a current two times or more of a maximum constraint current of a electric motor for use in these machines flows through the bimetal.

A variety of methods for solving the problems stated above have been proposed. As an example of these methods, JP-U-59-72641 discloses a case made of a heat resistant material such as ceramics.

JP-U-63-174145 discloses a method, where a motion frequency indicating plate having a plurality of saw-tooth-like protrusions is provided such that a bimetal sequentially engages with a different saw-tooth protrusion every time the bimetal performs a restoring motion to gradually lower the motion frequency indicating plate, and when the bimetal has repeated the restoring motion the number of times equal to the number of saw-tooth-like protrusions, the motion frequency indicating plate abuts to the internal bottom face of a case so as to prevent the bimetal from further performing the restoring motion. According to this method, even if an abnormal state of an electric motor is not solved, the bimetal is inhibited from performing the restoring motion after repeating it predetermined times, and it is maintained in the reverse state to break a constraint current.

JP-A-63-224125 discloses a method, where a first bimetal and a second bimetal having a reverse motion temperature higher than that of the first bimetal are connected in series in a manner that if an abnormal current occurs, the first bimetal first performs a reverse motion, and if the abnormal state still remains unsolved after the first bimetal has repeated the reverse motion and restoring motion, and the first bimetal is finally broken to cause contact deposition, an abnormal temperature rise resulting from the contact deposition causes the second bimetal to perform a reverse motion to break the abnormal current.

JP-U-64-1450 discloses a technique of arranging a second bimetal on the lower surface of a first bimetal such that if the first bimetal is broken to cause contact deposition, the second bimetal performs a reverse motion to lift up the first bimetal.

The aforementioned JP-U-64-35642 also discloses that the head of the adjusting bolt, to which the bimetal is mounted, is made as a separate part from the adjusting bolt, and is formed with a recess which is filled with a thermally soluble metal when the head is fitted on the adjusting bolt, such that the head is bonded on the tip of the adjusting bolt with this thermally soluble metal. While the bimetal is normally urged to the head by the spring, if the bimetal is broken to cause contact deposition and consequently heated, the thermally soluble metal is fused to release the bonding between the head and the adjusting bolt, whereby the bimetal and the head are lifted by an urging force of the spring.

JP-A-3-77228 discloses a method, where elongated holes 502 are formed through a bimetal at locations between a supporting hole 501 of the bimetal and two movable contacts 3, 4 to provide higher resistance portions having an electric resistance higher than that of the bimetal, so that Jour heat generated by eddy currents is concentrated on these higher resistance portions, thus rupturing the bimetal in the higher resistance portions. JP-A-3-77228 also describes that, similar effects can be produced by reducing the thickness of partial regions of the bimetal or providing recesses in the periphery of the bimetal, as alternative methods of providing the higher resistance portions.

Next, description will be made as to another overload protective apparatus which detects an abnormal state in which no eddy current is generated.

A separate type air conditioner, for example, has an indoor machine and an outdoor machine coupled to each other through pipes. If the piping is incompletely made, Freon or a coolant may leak. In this case, a compressor of the air conditioner will be excessively heated, while a current through an electric motor employed therein does not substantially increase from a no-load current, so that conventional protectors responsive only to a current, as disclosed in JP-A-59-72461 and so on, cannot protect the electric motor for this case.

Conventionally, to attend to this problem, a hermetic type protector is disposed inside a compressor to directly detect a temperature of the compressor, as disclosed in JP-U-60-95183, JP-U-62-38090, JP-Y2-63-5422, JP-A-63-61783 and so on. However, although this type of protector can prevent burn and damage caused by overheating due to the above-stated leak of a coolant, the hermetic type protector itself is very expensive, and moreover its mounting is so complicated that the number of manufacturing processes is increased, thus causing an increase in the manufacturing cost.

Also, since the protector is built in a compressor, when a failure occurs in the protector, the whole compressor must be subjected to a service for replacing the protector, thus incurring a disadvantage of increasing a service expenditure.

As a means to solve these problems, JP-A-2-139820 discloses an overload protective apparatus for mounting to an outer shell of an electric motor for driving a compressor, i.e., a two-element type thermal protector. Such a two-element type thermal protector is provided with a series circuit of a heater R and a temperature switch TH on an open end side of a cylindrical case which accommodates a main protector P constituted of a dish-shaped main bimetal 19 and so on, as shown in FIG. 8. The heater R is disposed near the main protector P.

The two-element type thermal protector as described above is disposed between a power supply switch SW and an electric motor M. In a normal state, the main protector P is closed, while the temperature switch TH is opened. Thus, the electric motor M is supplied with a driving current from a power supply, not shown, through the power supply switch SW and the two-element type thermal protector. If the temperature of a compressor rises due to an accident such as a leak of a coolant, the temperature switch TH detects this temperature rise and closes, as shown in FIG. 9A, to make the heater R conductive so that heat is generated from the heater R. By the heat from the heater R, the main bimetal of the main protector P is heated and opens contacts, as shown in FIG. 9B, to break the current to the electric motor M.

While a variety of methods for attending to contact deposition of a bimetal have been proposed as described above, they further imply the following problems.

If a case is formed of ceramics as described in JP-U-59-72641, although it is ensured that the case is protected from being burnt or damaged, windings of an electric motor, serving as a load, cannot be saved from the burn and damage. A further problem is that the case becomes expensive.

In a conventional mechanism which is provided with an operation frequency indicating plate as described in JP-U-63-174145, the number of times of reverse and restoring motions of a bimetal is limited by this operation frequency indicating plate, so that the following problems are left unsolved for putting this type of mechanism into practice:

(1) An overload protective apparatus for use in a refrigerator, air conditioner, dehumidifier or the like inevitably operates in response to failures of an electric compressor, i.e., failures caused by other than a mechanical lock, whereby a bimetal is quite easily held in a reverse state by the operation frequency indicating plate, thus resulting in an increase in demanding maintenance services.

(2) The operation frequency indicating plate advances the number of repeated reverse motions even for confirming operations in an adjustment procedure, thus decreasing the remaining number of times allowed to the reverse motion.

When serially connected first and second bimetals are used as described in JP-A-63-224125, since these bimetals must be simultaneously conducted, the following problems are left unsolved for putting this technique into practice:

(1) A range of the magnitude of an available current is limited depending on the specific resistance of these bimetals.

(2) When the specific resistance of the bimetals is short and a sufficient heat amount cannot be generated thereby, a heater line must be additionally provided. However, since an insulation distance must be maintained between the bimetals and the heater line, a space occupied by the heater line is also expanded, resulting in a larger size of the overload protective apparatus.

(3) Each of the first and second bimetals requires expensive contacts to be disposed thereon, which makes the overload protective apparatus extremely expensive.

When a head of an adjusting bolt is bonded to the adjusting bolt with a thermally soluble metal as described in JP-U-64-35642, the following problems are left unsolved for putting this technique into practice:

(1) When contact deposition occurs on a bimetal and the bimetal is heated to a high temperature, the thermally soluble metal begins melting and the head is finally separated from the adjusting bolt, so that the bimetal and the head of the adjusting bolt are lifted up by a spring. However, this lifting-up is advanced slowly due to the viscous property of the thermally soluble metal. Subsequently, when the lifted bimetal causes movable contacts to be detached from fixed contacts on the internal bottom face of a case, the current path is broken, so that the heat source is lost simultaneously with the breakage, whereby the thermally soluble metal directs to a solid phase. Nevertheless, if the urging force of the spring does not act to sufficiently overcome the viscous property of the thermally soluble metal, a sufficient contact separating amount (contact gap) cannot be ensured between the movable contacts and the fixed contacts when the bimetal is lifted up as described above.

(2) The above stated solid phase phenomenon of the thermally soluble metal is nothing but a load resistance for the spring, and acts to decrease a contact separating force of the spring at the time contact deposition occurs. It is therefore expected that the solid phase phenomenon constitute an obstacle to providing an overload protective apparatus for turning on and off a load through which a large current will flow.

(3) Since a creep exists in the bonding of the head with the adjusting bolt with a thermally soluble metal, a sufficient temperature difference should be ensured between the melting point of the thermally soluble metal and a reverse motion temperature of a bimetal. Generally, a required temperature difference for this case is approximately 40°–50° C. For this reason, an operation temperature at which contacts are detached is elevated, so that an available range of the apparatus may be limited in many applications.

(4) A highly stable facility is required for applying a melt thermally soluble metal into a recess in the head of the adjusting bolt, so that the facility cost for manufacturing this type of overload protective apparatus becomes unacceptably high.

When throughholes are formed through a bimetal so as to provide the bimetal with higher resistance portions having a higher electric resistance than the remaining region of the bimetal, as described in JP-A-3-77228, these holes should be located near movable contacts on the bimetal as is apparent from FIG. 7.

When recesses are formed in the periphery of a bimetal, although their positions are not disclosed in JP-A-3-77228, it can be said that these recesses are necessarily formed near movable contacts for a reason similar to the above stated case of forming throughholes.

Further, for reducing the thickness of a bimetal, although no disclosure is given with respect to where and how to thin the bimetal, it is easily estimated with respect to the positions that regions near movable contacts will be thinned similarly to the case of forming the throughholes. With respect to the method, it can be thought to partially thin a bimetal by pressing or the like. However, in any cases, when a resilient force of a bimetal acts on movable contacts, a deformation amount of the bimetal inevitably concentrates on the higher resistance portions near the movable contacts, the cross-section of which is minimal. Therefore, if the same contact pressure is to be ensured as compared with the prior art, the following problems can be foreseen:

(1) A larger adjustment margin must be provided for the bimetal.

(2) A stress of the bimetal is increased to cause a break to initiate from the higher resistance portion, which results in accelerating fatigue of the bimetal and consequently shortening the life.

(3) In the case of the bimetal formed with throughholes or recesses, the life of the bimetal is acceleratively shortened by a notch effect.

(4) In the method of partially reducing the thickness of a bimetal, the life of the bimetal is increasingly shortened by a machining effect exerting on a wide region of the bimetal and by peeling of layers in a different metal bonded portion (a laminated portion).

To avoid the above problems, if a bimetal is to be put into practice with a lower contact pressure compared with the prior art:

(1) As is well known, contact deposition is more likely to frequently occur due to a decrease in contact pressure.

(2) As a result, the life of a bimetal, particularly for use in turning on and off a large capacitive load, is significantly shortened, whereby the function of the bimetal will be disabled at an earlier time.

Further, if a bimetal intended to decentrate stresses of the bimetal as disclosed in JP-U-60-183349 (FIG. 6) and the bimetal proposed by JP-A-3-77228 (FIG. 7) are combined for a practical use, the following problems may arise:

(1) Since elongated holes such as 502 shown in FIG. 7 exist between the movable contacts and the radial slits, a spring constant of the bimetal will be decreased, whereby the basic characteristics of the bimetal are largely changed.

(2) Since the radial slits causes a current path resistance of the bimetal to become larger, the length of the elongated holes must be further extended in order to provide the higher resistance portions at locations close to the movable contacts rather than locations near the central supporting hole. Consequently, the spring constant of the bimetal becomes smaller, causing the contact pressure to be lower and the movable and fixed contacts to be more susceptible to contact deposition, whereby such a bimetal is not acceptable in a practical use.

Additionally, in this prior art, the bimetal supporting mechanism does not have a spring for urging the bimetal to the head of the adjusting bolt, so that the bimetal, after ruptured, may freely take a position, incurring a fear that a sufficient distance for separation cannot be ensured between the fixed contacts and the movable contacts on the bimetal.

With the two-element type thermal protector shown in FIGS. 8, 9A and 9B, when an accident such as a leak of a coolant causes the temperature in a compressor to rise, the temperature switch TH detects heat radiated from a dome of the compressor. When the detected temperature reaches a predetermined value, the temperature switch TH closes the current path to conduct and heat the heater R, whereby the main bimetal 19 of the main protector P is heated to open the current path. Therefore, when the state shown in FIG. 8 is changed through the state shown in FIG. 9A to the state shown in FIG. 9B, the following problems may be thought:

1. As is well known, the moment the bimetal 19 is opened to break a current to the electric motor M for driving the compressor, a surge voltage de is generated as represented by the following equation:

$$de=di/dt$$

where de is a circuit voltage and dt is a breaking time.

The surge voltage generated in this event is applied to a closed circuit including the electric motor M for driving the compressor, temperature switch TH and heater R, where a majority of the voltage is applied to the heater TH having a large impedance.

It should be noted that the surge voltage de generated by the electric motor M for driving the compressor may reach in general several hundred to one thousand and several hundred volts.

2. When the bimetal is restored to the original state to close the circuit, its main contacts present not a few mechanical vibrations (i.e., chattering or bouncing), so that the electric motor M for driving the compressor is repetitively turned on and off, though for a short period of time. Also in this event, a surge voltage is generated as described above, and if the temperature switch TH is closed, a majority of the surge voltage is applied to the heater R.

From the foregoing, the heater R is required to have an overvoltage characteristic which can bear such a large surge voltage. This is because if the heater R could not bear this large voltage, the heater R would be cut in the worst case, whereby functions as the two-element type thermal protector cannot be achieved.

However, if selection is made to the heater R in view of the overvoltage characteristic bearable to the surge voltage, a selected heater will be larger and expensive.

SUMMARY OF THE INVENTION

It is an object of the present invention to provide a simply constructed and cheap overload protective apparatus utilizing a polymetallic element, e.g., a bimetal or a trimetal, as described hereinafter for solving the above stated problems which is capable of promptly and permanently breaking a current path at a predetermined operation temperature as well as maintaining a high reliability in a normal use.

It is another object of the present invention to provide an overload protective apparatus of a two-element thermal protector type which may employ a small and cheap heater and a temperature switch.

To achieve the above objects, the present invention provides a structure which has different current densities depending on locations on a polymetallic element such that at least one of movable contacts bonded on the polymetallic element is reliably ruptured by heat generated from the polymetallic element when an extremely large current flows through the polymetallic element.

The following structures may be thought as the polymetallic element employed in the present invention:

(1) A bimetal is provided with a plurality of throughholes around movable contacts such that the cross-sectional area of a current path of the bimetal becomes smaller near the movable contacts. The throughholes may be radially formed from the center of each of the movable contacts or concentrically arranged around the same.

Since the bimetal is constructed such that the cross-sectional area of the current path is smaller near the movable contacts than other regions, current densities in these portions of the bimetal are larger, so that the bimetal is ruptured at these portions when an abnormal current flows therethrough.

(2) Movable contacts are welded on a bimetal with small welding areas such that the welded portions are ruptured when an abnormal current flows through the bimetal.

(3) The width of movable contact bonding portions on a bimetal is made substantially identical to the diameter of movable contacts such that a current density becomes particularly larger near the movable contact bonding portions.

(4) Movable contacts bonded on a bimetal are made of a material having different electric conductivity and thermal conductivity from those of the bimetal.

(5) The volumes of a pair of movable contacts are made different such that a current density in one of them is larger than the other.

(6) The areas of end faces of a bimetal on which movable contacts are to be bonded are made different from each other such that different current densities are given to the bimetal from the respective movable contacts.

(7) A plurality of slits are radially formed from a supporting hole provided at the center of a bimetal, where at least a pair of slits located at opposite positions to each other with respect to a straight line connecting movable contacts are elongated to vicinities of the periphery of the bimetal in comparison with the other slits. With such a structure, a current density is made larger in portions of current paths between the elongated slits and the outer periphery of the bimetal, the cross-sectional area of which is smaller, whereby if an abnormal current flows, the bimetal is ruptured at these portions.

(8) A bimetal is generally formed in a two-layer structure including a metal layer having a higher expansion coefficient and a metal layer having a lower expansion coefficient, with the exception that portions of the bimetal around movable contacts are formed in a single-layer structure consisting only of a metal having a higher or a lower expansion coefficient. Since the movable contacts are also made in a single-layer structure, the current density is higher in these portions, and accordingly greater amounts of heat are generated in these portions. Thus, if an abnormal current flows, these single-layer structure portions are ruptured.

(9) A polymetallic elememt, e.g., a trimetal is generally formed in a three-layer structure including a metal layer having a higher expansion coefficient, a metal layer having a lower expansion coefficient, and an intermediate metal layer sandwiched by the first two metal layers, with the exception that portions of the polymetallic element around movable contacts are formed in a single-layer structure consisting only of a metal having a higher or a lower expansion coefficient.

(10) A polymetallic element having a combination of the respective characteristics described above. For example, a bimetal may be provided with a plurality of throughholes around movable contacts such that a current path resistance becomes larger near the movable contacts, as well as with a plurality of slits extending radially from a supporting hole formed at the center of the bimetal, where at least a pair of slits located at opposite positions to each other with respect to a straight line connecting movable contacts are elongated to vicinities of the periphery of the bimetal in comparison with the other slits.

Also, the overload protective apparatus utilizing a polymetallic element according to the present invention, which may be regarded as a two-element type thermal protector having any of the above described polymetallic elements built therein, includes a heater having one terminal connected to a temperature switch and the other terminal connected to a main polymetallic element such that a series circuit including the temperature switch and the heater is completely cut away from a load when the polymetallic element performs a reverse motion.

As explained above, according to the present invention, when an abnormally large current flows through the overload protective apparatus due to a load falling into an abnormal state, at least one of the movable contacts bonded to the polymetallic element is reliably ruptured to permanently break a circuit to the load. As a result, the following effects can be produced.

1. A highly safe overload protective apparatus can be realized without changing the conventional basic structure.
2. The polymetallic element of the present invention may be employed in all overload protective apparatuses without increasing the number of elements and irrespective of the presence or absence of a heater, so that the overload protective apparatuses can be manufactured at a lower cost.
3. Since there is no negatively acting factor for breaking a circuit, the polymetallic element of the present invention may be employed in all overload protective apparatuses for use in a range from a small current to a large current.

Further, according to the present invention as a two-element type thermal protector, since a surge voltage generated when a main polymetallic element performs a reverse motion is not applied to a heat generating element or a temperature switch, the following effects can be produced:

1. A small and cheap heat generating element can be used for a combination with the main polymetallic element. From the fact that the volume of the heat generating element can also be adjusted arbitrarily, a good thermal response is provided.
2. A small and cheap temperature switch may also be arbitrarily selected, and its responsibility is made excellent.
3. Accordingly, the two-element type thermal protector comprising these elements can also be made compact, cheap and excellent in operability.
4. As a result, the two-element type thermal protector provides a protection characteristic which not only covers a wide range similar to the conventional like protectors but also is largely improved, so that thermal damage, which may possibly be given to an electric motor for driving a compressor or a load, can be reduced, and moreover a high reliability is held for a long term.
5. The present invention can be easily applied to a variety of apparatuses without changing the conventional basic structure, thus providing large practical effects.

DESCRIPTION OF THE PREFERRED EMBODIMENTS

Embodiments of the present invention will hereinafter be described with reference to the accompanying drawings.

Figure 1:
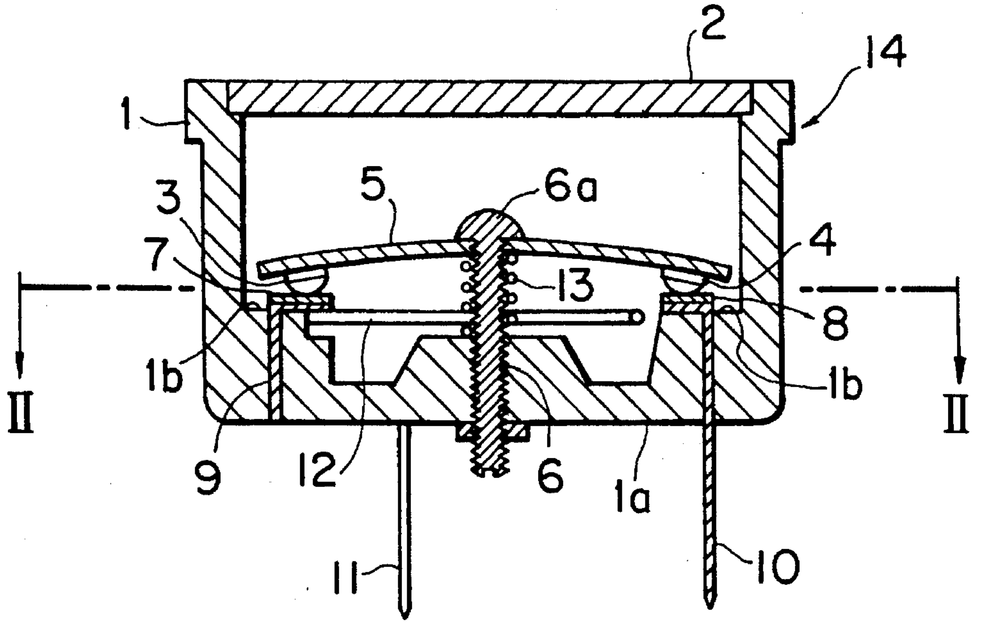
FIG. 1 PRIOR ART
FIG. 1 is a longitudinal sectional view showing an example of conventional overload protective apparatuses.
Figure 2:
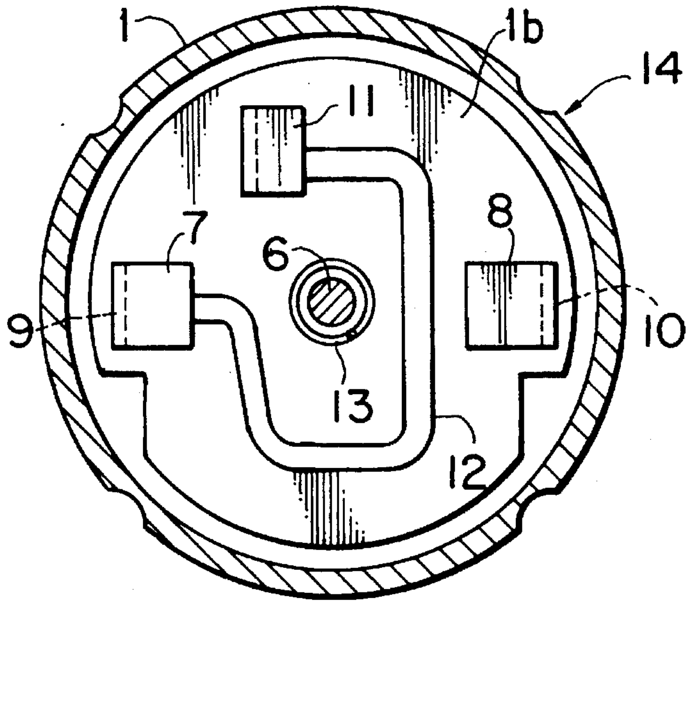
FIG. 2 PRIOR ART
FIG. 2 is a plan view taken from the parting line II—II in FIG. 1.
Figure 10:
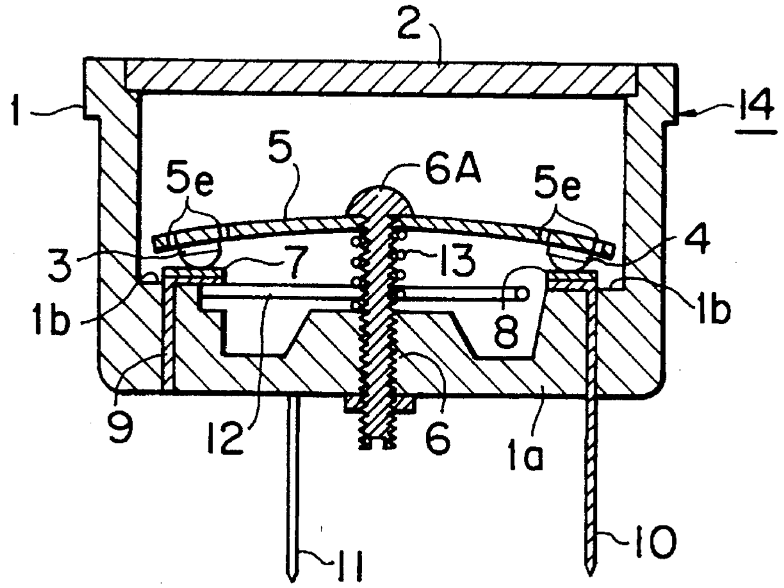
FIG. 10 is a longitudinal sectional view showing an example of an overload protective apparatus according to the present invention.

FIG. 10 is a longitudinal sectional view showing the whole arrangement of one embodiment of the overload protective apparatus according to the present invention, where parts corresponding to those in FIG. 1 are designated the same reference numerals. The overload protective apparatus of FIG. 10 includes throughholes indicated by 5*e*.

In FIG. 10, the throughholes 5*e* are formed around portions of a bimetal 5 on which movable contacts 3, 4 are bonded. The rest of the structure in FIG. 10 is similar to that of the conventional overload protective apparatus shown in FIG. 1, so that similar explanation on FIG. 10 will be omitted. It is also noted that an electric circuit of this embodiment, when in use, is also similar to that shown in FIG. 3.

Figure 6:
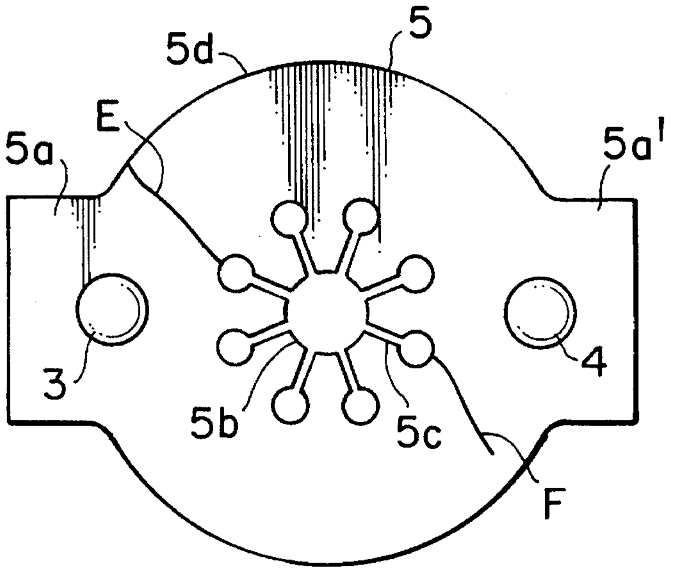
FIG. 6 PRIOR ART
FIG. 6 is a plan view showing a broken state of a bimetal as illustrated in FIGS. 1 and 4.
Figure 7:
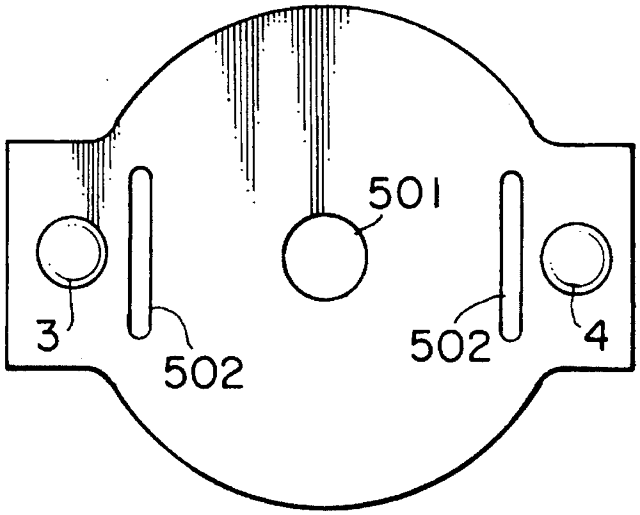
FIG. 7 PRIOR ART
FIG. 7 shows an example of a conventional bimetal.
Figure 8:
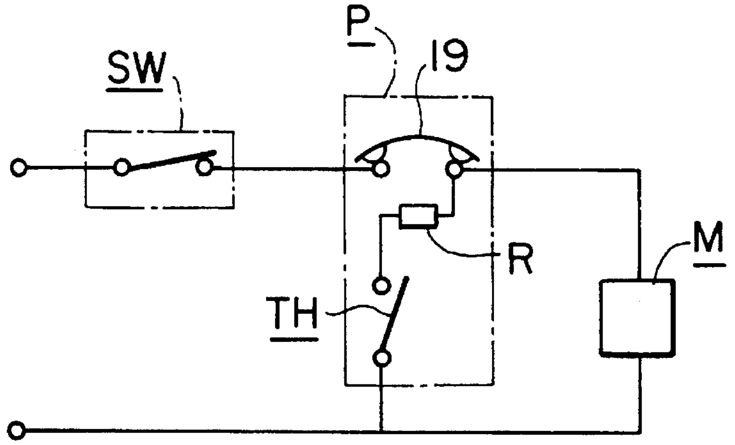
FIG. 8 PRIOR ART
FIG. 8 is an electric circuit diagram of a machine which employs a conventional overload protective apparatus.
Figure 9A:
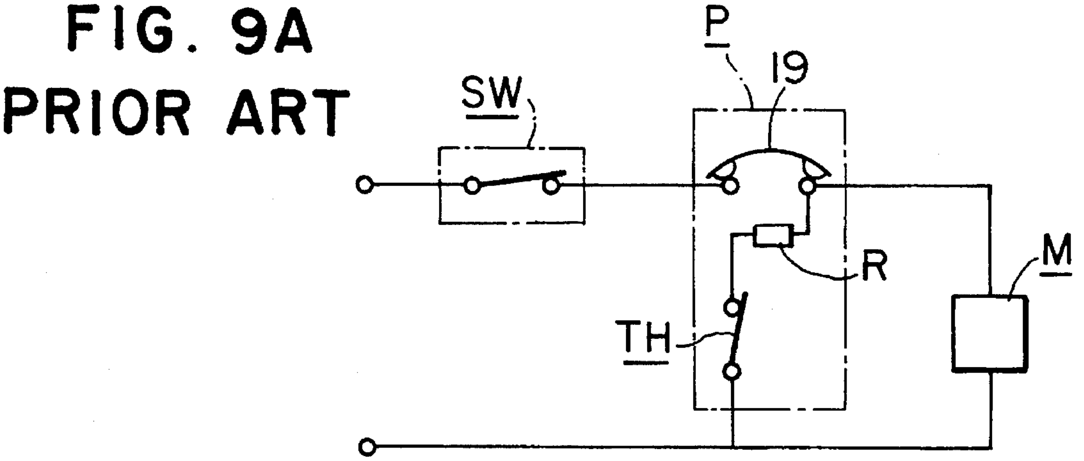
FIG. 9A PRIOR ART
FIGS. 9A, 9B are electric circuit diagrams for explaining circuit operations of the conventional overload protective apparatus illustrated in FIG. 8.
Figure 9B:
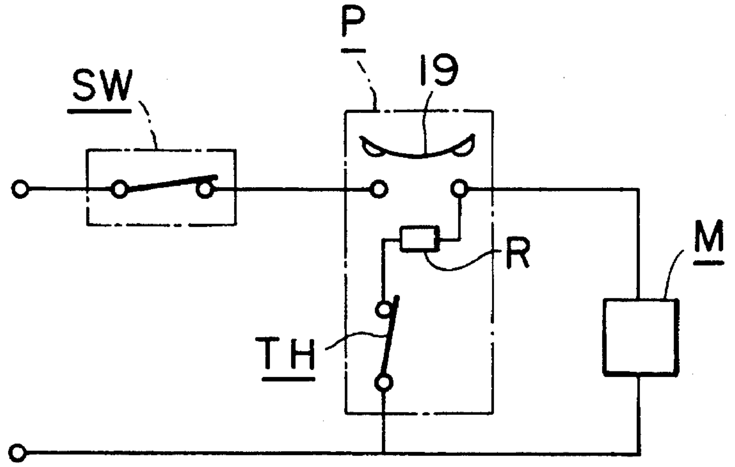
Figure 11:
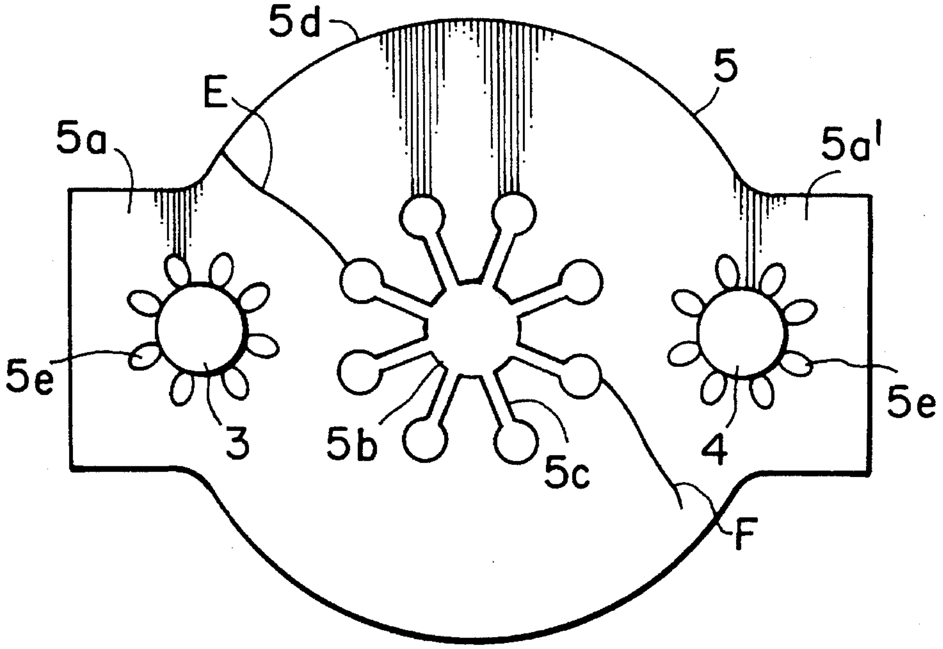
FIG. 11 shows an example of a bimetal used in the overload protective apparatus of FIG. 10.

FIG. 11 is a plan view showing a specific example of the bimetal 5 in FIG. 10, where parts corresponding to those in FIGS. 10 and 6 are designated the same reference numerals.

In FIG. 11, around bonding portions for the movable contacts 3, 4 on the bimetal 5, a plurality of throughholes 5*e* are formed, which radially extend from the respective bonding portions and are equally spaced from each other. Stated another way, these bonding portions are supported on the bimetal 5 by a plurality of narrow supporting members made of the same material as the bimetal 5 between the throughholes *5e*.

Figure 3:
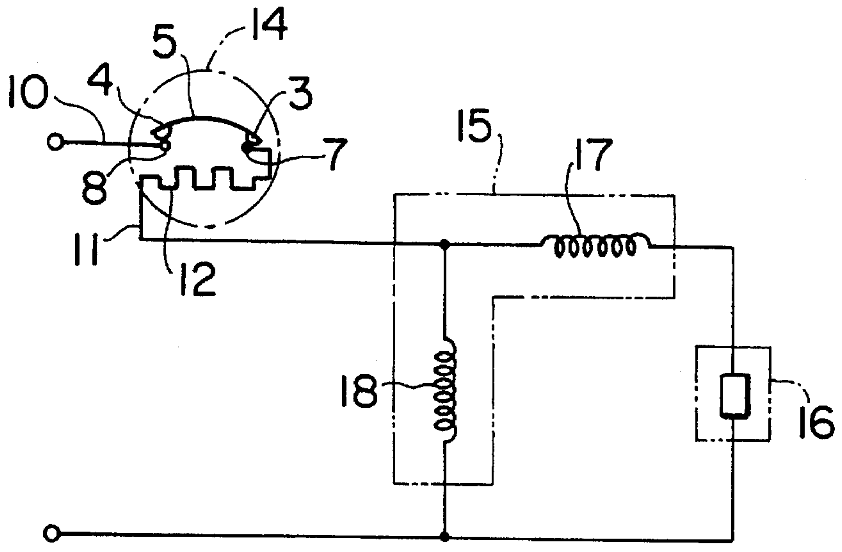
FIG. 3 PRIOR ART
FIG. 3 is an electric circuit diagram of a machine which employs the overload protective apparatus of FIG. 1.
Figure 4:
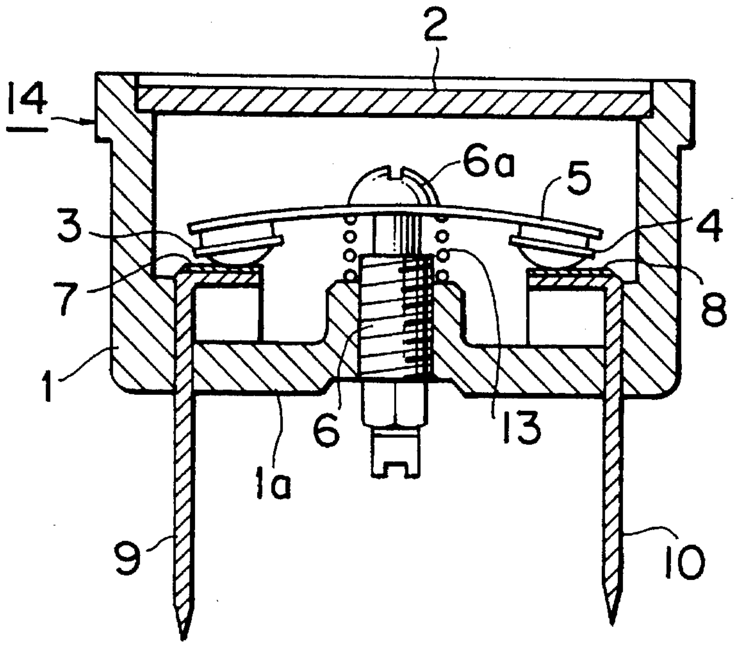
FIG. 4 PRIOR ART
FIG. 4 is a longitudinal sectional view showing another example of conventional overload protective apparatuses.
Figure 5:
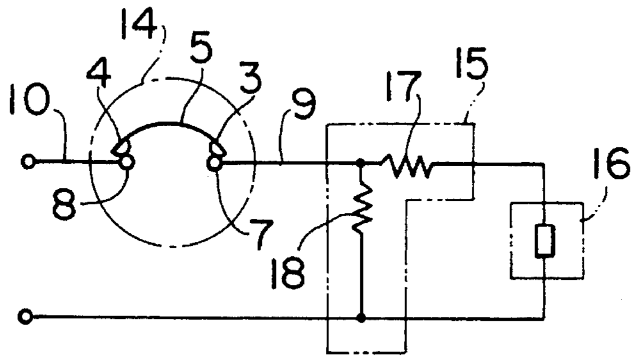
FIG. 5 PRIOR ART
FIG. 5 is an electric circuit diagram of a machine which employs the overload protective apparatus of FIG. 4.

Assuming that the overload protective apparatus of this embodiment, provided with the bimetal 5 constructed as described above, is used in an electric motor 15 as shown in FIG. 3, when the electric motor 15 is normal, the electric motor 15 is in a continuously conductive state with a small operation current supplied thereto after a large starting current has flown through the bimetal 5 and a heater line 12 for a short period of time upon starting. Generally, this starting current flows for approximately two second or less and is restricted by the action of a starter 16 or the like. In this event, a reverse motion of the bimetal 5 is not induced by a temperature rise caused by heat generation energy of the bimetal 5 itself and heating energy of the heater line 12, similarly to the prior art.

If the electric motor 15 is continuously applied with an excessive constraint current subsequent to the starting current, which is a maximal value, self-generating heat energy of the bimetal 5 and the heater line 12 increases, and the bimetal 5 suddenly performs a reverse motion the moment the temperature of the bimetal 5 reaches a reverse motion temperature, whereby the movable contacts 3, 4 are detached from fixed contacts 7, 8, respectively, to break the current supplied to the electric motor 15. Thus, the bimetal 5 and the heater line 12 begin cooling down, and when a restoring motion temperature is reached at a later time, the bimetal 5 performs a restoring motion to be restored to the original position, whereby the movable contacts 3, 4 are brought into contact with the fixed contacts 7, 8, respectively to again supply a current to the electric motor 15.

When the bimetal is restored to the original position, if the electric motor 15 has been released from a constraint state, the electric motor 15 will normally operate, and the bimetal 5 will not again perform the reverse motion. This is completely the same as the prior art.

However, if the electric motor 15 still remains in the constraint state, the bimetal 5 repeats the reverse and restoring motions. Consequently, if the bimetal 5 is fatigued by the repeated motions of, for example, approximately 5,000 to 15,000 times, breaks E, F occur from the tips of opposing slits toward the outer periphery *5d*, as shown in FIG. 11.

When the bimetal 5 is broken as described above, the characteristics of the bimetal 5 vary to cause decreases in a contact pressure and a contact separating force as well as changes in the reverse motion temperature and the restoring motion temperature. Even if the bimetal 5 performs the reverse motion, intervals between the reverse motions are shortened due to decreased displacement amounts of the bimetal 5 near the movable contacts 3, 4 provided by the reverse motion, whereby a conduction ratio of the constraint current flowing through the bimetal 5 and the heater line 12 is increased, resulting in raising more and more the temperature inside the case 1.

If contact deposition occurs between the movable contacts 3, 4 and the fixed contacts 7, 8, respectively, as a result, a large constraint current will continuously flow between the movable contacts 3, 4 and the bimetal 5. However, in this embodiment, since the plurality of throughholes *5e* are provided around the bonding portions of the bimetal 5 for the movable contacts 3, 4, the supporting members between the throughholes *5e* are narrow, so that temperatures of these supporting members significantly rise, though not uniformly. Then, when the temperatures of the supporting members exceed the melting point defined for the material of the bimetal 5, the supporting members begin fusing. When the supporting members are partially fused off, a current further concentrates on the remaining members. Thus, the fusing of the supporting members is accelerated in a chain reaction manner, and finally the peripheries of the movable contacts 3, 4 are fused in a ring shape as indicated by a reference X in FIG. 12. When they are fused, the bimetal 5 performs a reverse motion to detach the movable contacts 3, 4 from the fixed contacts 7, 8, thereby breaking the current path. As the bimetal 5 is cooled by the interrupted current, the bimetal 5 is restored to the original state as shown in FIG. 13.

Figure 13:
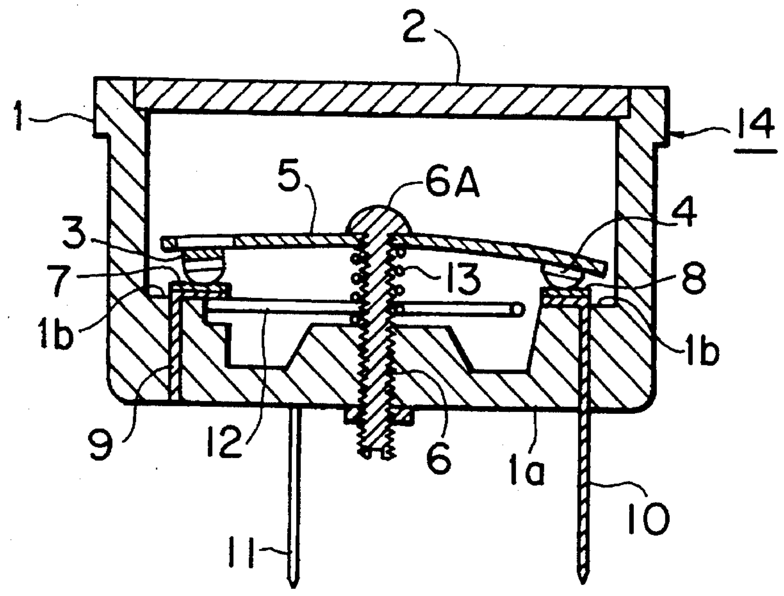
FIG. 13 is a longitudinal sectional view showing movable contacts on a bimetal in the embodiment shown in FIG. 10 which are deposited on fixed contacts.

In FIG. 13, the movable contact 3 has been removed from the bimetal 5 and remains sticking to the fixed contact 7, so that the conductive state will not be restored.

In this manner, when the electric motor 15 remains in a constraint state, the movable contact 3 is removed from the bimetal 5 to cause the electric circuit shown in FIG. 3 to be in a broken state, and the electric motor 15 is not applied with a current as long as the overload protective apparatus 14 is not replaced, In this manner, the electric motor 15 can be protected from a large current by the overload protective apparatus.

Figure 12:
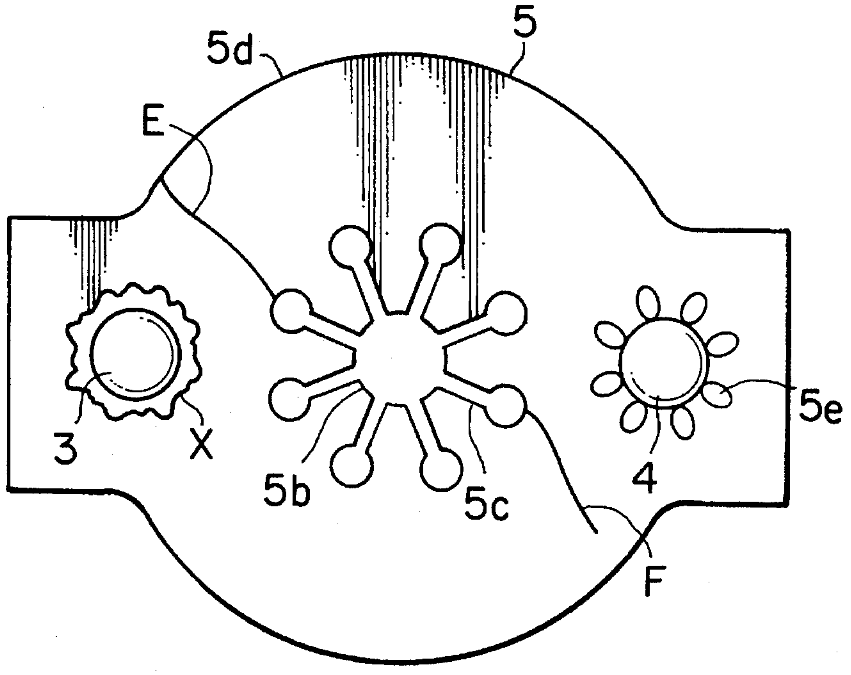
FIG. 12 is a diagram showing a ruptured movable contact portion of the bimetal of FIG. 11.

Incidentally, the above action generally exerts only on one of the movable contacts 3 and 4, as shown in FIGS. 12, 13, and extremely rarely presents on both of them. This is because a difference in electric resistance arises depending on a difference in welding effective area between the movable contacts 3, 4 and the bimetal 5, which have been resistance-welded; situations of the movable contacts 3, 4 deposited with the fixed contacts 7, 8; and so on. Different heat amounts generated due to the different electric resistances at this time affect temperature rise in regions over the throughholes *5e* formed around the movable contacts 3, 4 of the bimetal 5. Also, one of the movable contacts 3, 4 may be heated more than the other depending on a direction in which the overload protective apparatus is mounted, which also causes the above action to exert only on either one of the movable contacts 3, 4.

As described above, since it is sufficient that either one of the bonding portions for the movable contacts 3, 4 is ruptured, no limitation is necessarily made on which of the bonding portions should be ruptured. However, if a limitation is made such that the bonding portion for the movable contact 3, for example, is to be ruptured, the throughholes *5e* may be formed only around the bonding portion for the movable contact 3. Therefore, it goes without saying that whether the throughholes *5e* are formed around one or both of bonding portions for the movable contacts 3, 4 is within the discretion to design the overload protective apparatus.

In this embodiment as described above, the throughholes *5e* are provided in accordance with conditions in which the overload protective apparatus is used, i.e., a current flowing therethrough, to ensure that the circuit is broken when contact deposition occurs.

According to experiments made by the inventors, for bimetals used in a relatively small current region, e.g., refrigerators and so on, i.e., TM-1 defined by JIS C2530 (volume resistivity=140 μΩ.cm at 20° C.) and TM-2 (volume resistivity=80 μΩ.cm at 20° C.), and bimetals used in a relatively large current region, e.g., air conditioners and so on, i.e., TM-6 (volume resistivity=20–50 μΩ.cm at 20° C.), a variety of materials having thicknesses of 0.15 mm, 0.18 mm and 0.20 mm were prepared and subjected to the experiments, and it was revealed as a result that the degree of influence of the radial throughholes *5e* on a temperature rise by local heat generation can be expressed by the following equation:

$$\Delta T = 0.24 I^2 RT/MC$$

where

ΔT: temperature rise in a region of the bimetal 5 including the throughholes 5e (hereinafter simply called "the throughhole region) (° C.)

I: current flowing through the throughhole region (A)

R: resistance affecting the throughhole region (Ω)

T: time during which the current flows through the throughhole region (sec)

M: influencing mass of the throughhole region (g)

C: specific heat (cal/g/° C.)

According to the above equation, when the cross-sectional area of the bimetal is reduced to one half by the throughholes 5e, the mass is also reduced to one half, whereby the resistance R in this region is doubled. As a result, the temperature rises in this region at a speed four times higher than the remaining region of the bimetal, and accordingly a time required for the temperature to reach the same value is reduced to a quarter.

Stated another way, when a current of the same magnitude is applied to a bimetal formed with the throughholes 5e and a bimetal without them, the former can be ruptured in a time four times shorter than the latter. Also, assuming that the same rupture time is provided for these bimetals, the bimetal formed with the throughholes 5e may be applied with a current, the magnitude of which is smaller by a factor of four than the bimetal without them. Thus, conditions can be arbitrarily set in accordance with the size of the throughholes 5e.

Additionally, if the throughholes 5e are formed such that they do not largely extend near the movable contacts 3, 4, that is, if the throughholes 5e are limited within small areas around the movable contacts 3, 4, a disadvantage of a larger adjustment margin, as required in the prior art, is avoided. On the contrary, when the bimetal 5 performs a reverse motion, regions around the bonding portions for the movable contacts 3, 4 on the bimetal 5 can freely take form by the action of the throughholes 5e, thus preventing a break to run from either of these regions. As a result, the overload protective apparatus 14, particularly for turning a large current on and off, has advantages of improved reliability and so on.

Further advantageously, the throughholes 5e absorb mechanical vibrations (chattering, bouncing and so on) which may occur when the movable contacts 3, 4 are brought into contact with the fixed contacts 7, 8 during a restoring motion of the bimetal 5. This results in prolonging the life of the overload protective apparatus. Conversely, if the overload protective apparatus with the throughholes 5e is designed to have the same life as conventional one, contact volumes can be reduced, which can correspondingly reduce the first cost thereof. It is thus appreciated that the formation of the throughholes 5e through the bimetal 5 results in producing a number of effects.

Figure 14:
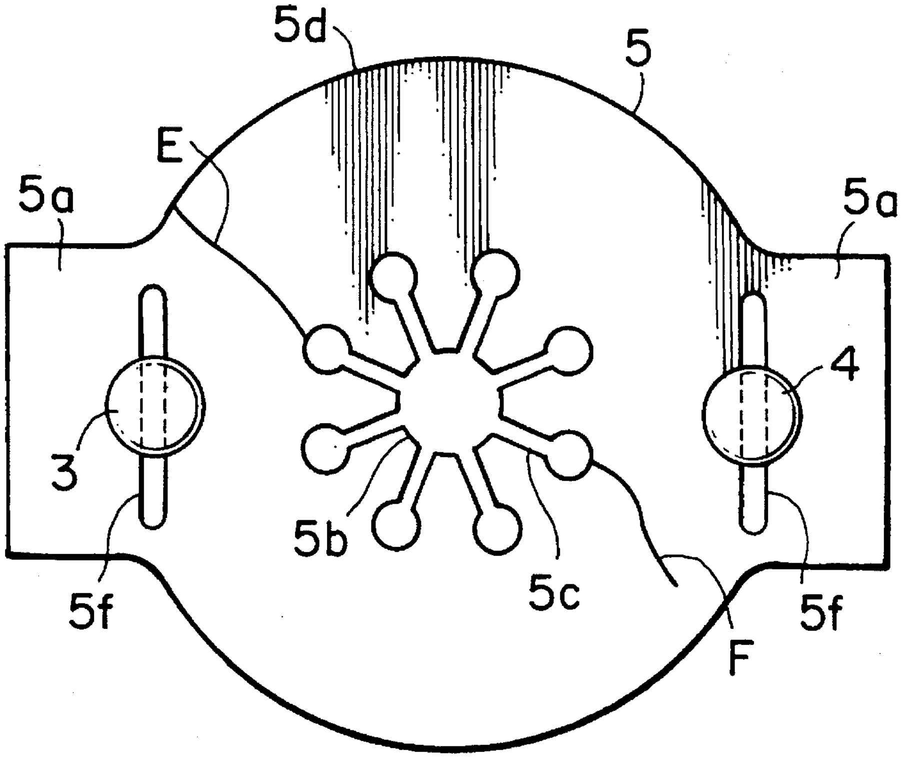
FIG. 14 shows another example of the bimetal used in the overload protective apparatus of FIG. 10 wherein elongated throughholes are formed in regions including the bonding portions for movable contracts.

Incidentally, while in the specific example shown in FIG. 14, throughholes such as the throughholes 5e or elongated throughholes 5f are formed in regions including the bonding portions for the movable contacts 3, 4, grooves or recesses may be alternatively formed in such regions. The main point is to provide a means to increase the electric resistance in these regions.

FIG. 14 is a plan view showing another specific example of the bimetal 5 in FIG. 10. Note that the bimetal 5 in FIG. 14 includes the elongated throughholes 5f instead of the radially formed throughholes 5e. Other parts corresponding to those in FIG. 11 are designated the same reference numerals.

Figure 15:
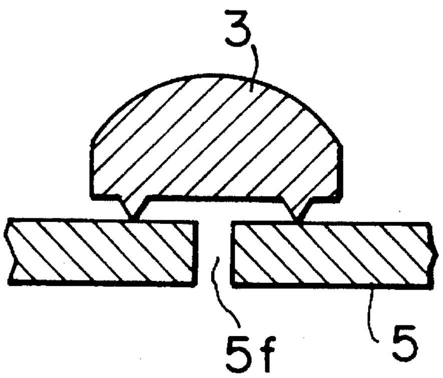
FIG. 15 is a cross-sectional view of a movable contact bonding portion shown in FIG. 14.

In FIG. 14, unlike the specific example shown in FIG. 11, the throughholes 5f are formed in a manner that each of them extends across the bonding portion for the movable contact 3 or 4 on the bimetal 5 and in the direction perpendicular to the direction of the supporting hole 5b when viewed from the movable contact 3 or 4. The movable contacts 3, 4 are each secured on the bimetal 5 by resistance welding such that they step over the elongated throughholes 5f as shown in FIG. 15.

Figure 16:
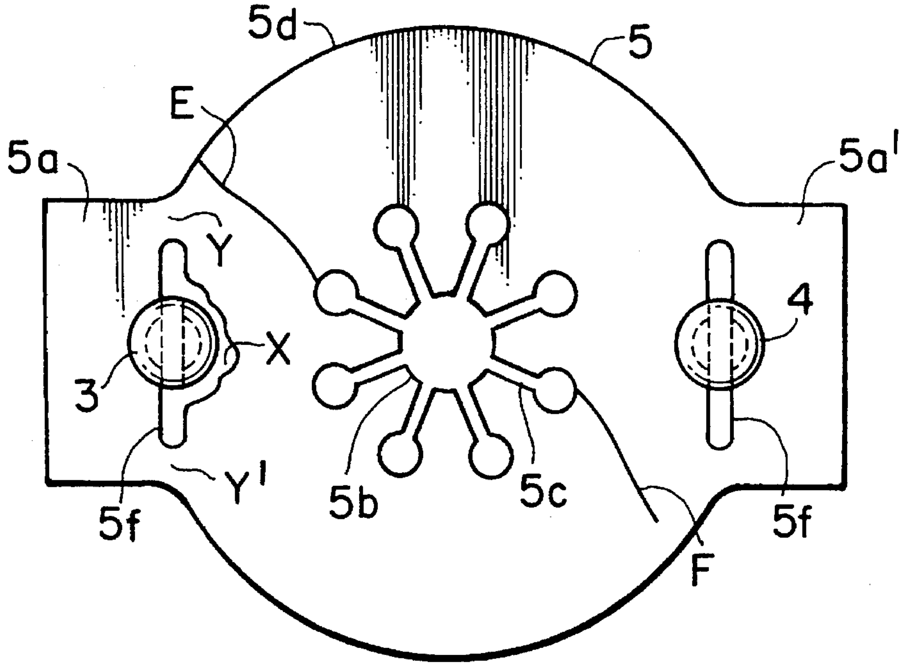
FIG. 16 shows a deposited state in a movable contact bonding portion on a bimetal illustrated in FIG. 14.
Figure 17:
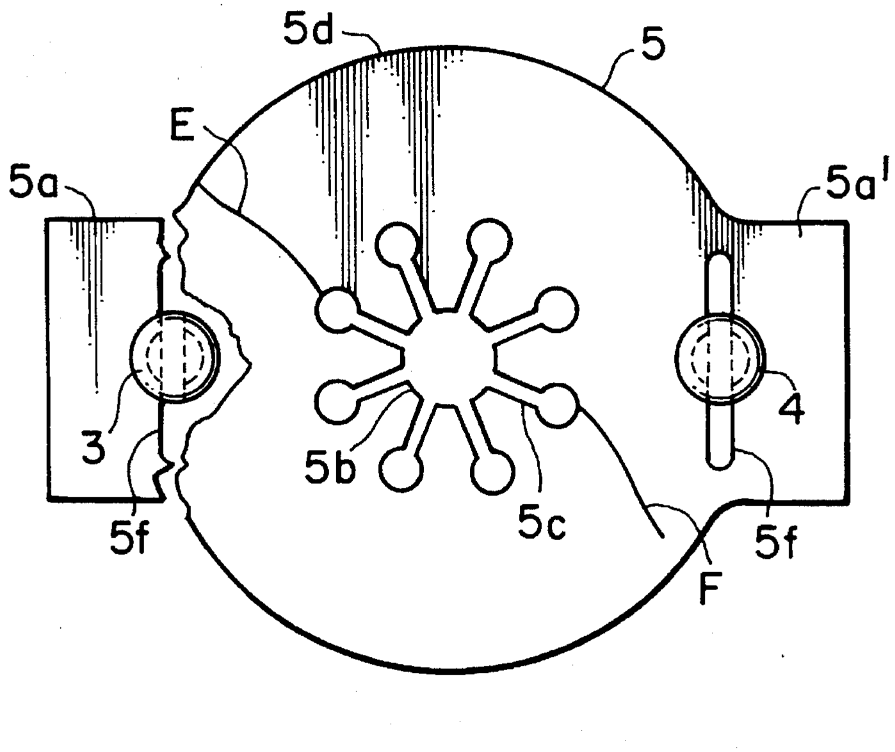
FIG. 17 shows a ruptured movable contact on the bimetal illustrated in FIG. 14.

In an overload protective apparatus employing the bimetal of this specific example, when contact deposition occurs, the portion with the highest current density is first to fuse, and subsequently the rupture expands to the remaining portion. More specifically, since the movable contact 3 is bonded to the bimetal 5 with narrow bonding areas as shown in FIG. 15, a region near one of bonding portions between the movable contact 3 and the bimetal 5 first begins fusing, and the one bonding portion between the movable contact 3 and the bimetal 5 is ruptured as indicated by X in FIG. 16. Subsequently, a large current flows through the other bonding portion, through which the movable contact 3 still remains in contact with the bimetal 5, i.e., through portions Y, Y' which are opposite to the extreme ends of the elongated throughhole 5f on the bimetal 5, which results in rupturing these portions Y, Y' as shown in FIG. 17.

As a result, the movable contact 3 is removed from the bimetal to break the current path, thus producing an effect similar to that provided when the bimetal 5 of FIG. 11 is employed.

While it is assumed in the foregoing example that first ruptured is a region near the bonding portion for the movable contact 3 on the supporting hole 5b side, a region near the other bonding portion for the movable contact 3 on the opposite side of the supporting hole 5b may first be ruptured. In this case, if the region near this bonding portion is ruptured, a large current flows through the bonding portion for the movable contact 3 on the supporting hole 5b side, which causes the region of the bimetal 5 near this bonding portion to be heated and consequently ruptured. Therefore, in this case, the movable contact 3 only is removed from the bimetal 5 as shown in FIG. 12.

Figure 18:
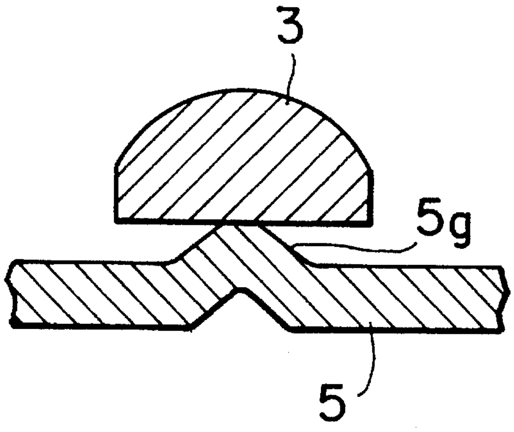
FIG. 18 is a cross-sectional view showing another embodiment wherein a movable contact bonding portion on the bimetal illustrated in FIG. 10 is formed with a protrusion.

FIG. 18 is a cross-sectional view of another specific example of the bimetal in FIG. 10 showing a region near a bonding portion of the bimetal 5 for bonding the movable contact 3 thereon. The bimetal 5 is formed with a protrusion 5g as the bonding portion for the movable contact 3. Parts corresponding to those in the previously referred drawings are designated the same reference numerals.

In FIG. 18, the bimetal 5 is formed with the conical protrusion 5g by plastic deformation (pressing), and the movable contact 3 is bonded on this protrusion 5g by resistance welding. The other movable contact 4 is similarly bonded on a like protrusion.

Figure 19:
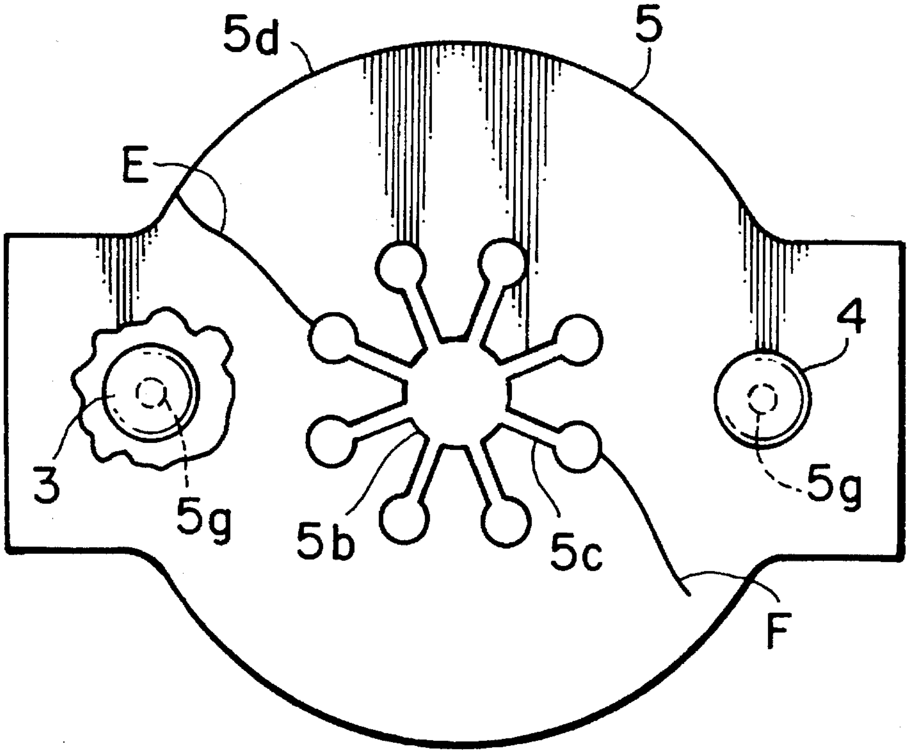
FIG. 19 is shows a ruptured movable contact on the bimetal of FIG. 18.

With the above stated construction, since the area of the bonding portion between the movable contact 3 and the bimetal 5 is small, and the bimetal 5 is cured when the protrusion 5g is formed thereon so that the specific resistance thereof has been higher, a large current, if flowing through this bonding portion, will generate an increased amount of heat in this portion, whereby a peripheral region of the protrusion 5g is ruptured in a ring shape as shown in FIG. 19, with the result that the movable contact 3 is removed from the bimetal 5. Thus, a similar effect to the case of employing the respective specific examples described above can be produced by using this structure. Incidentally, it is desirable that the area of the bonding portion be 1/5–1/10 as much as the area of the bonding surface of the movable contact 3.

Figure 20:
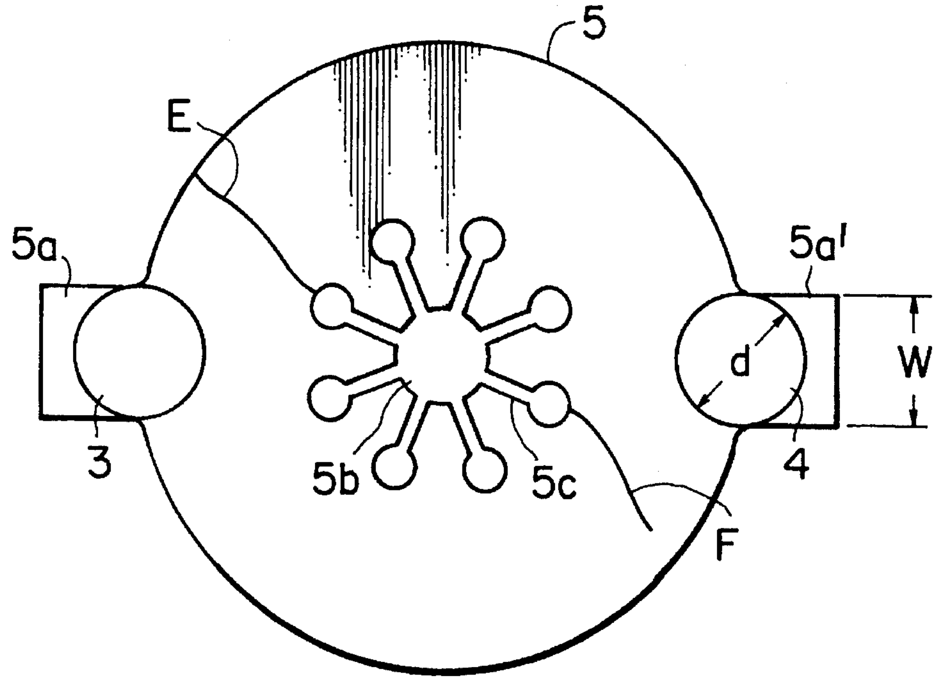
FIG. 20 is a plan view showing another embodiment of a bimetal used in the overload protective apparatus of FIG. 10 wherein the width of end faces of movable contact bonding portions is made substantially equal to the head diameter of the movable contacts.

FIG. 20 is a plan view showing a further specific example of the bimetal in FIG. 10, where parts corresponding to those shown in the previously referred drawings are designated the same reference numerals.

In the specific example shown in FIG. 20, the width of end faces 5a, 5a' of bonding portions for bonding the movable contacts 3, 4 on the bimetal 5 is made substantially equal to the head diameter d of the movable contacts 3, 4. With this structure, the current densities from the movable contacts 3, 4 becomes larger, and heat released from the end faces 5a, 5a' is worsened, whereby if a large current flows, generated heat amounts are increased in these resistance portions to allow the bimetal 5 to be easily ruptured in these portions.

Figure 21:
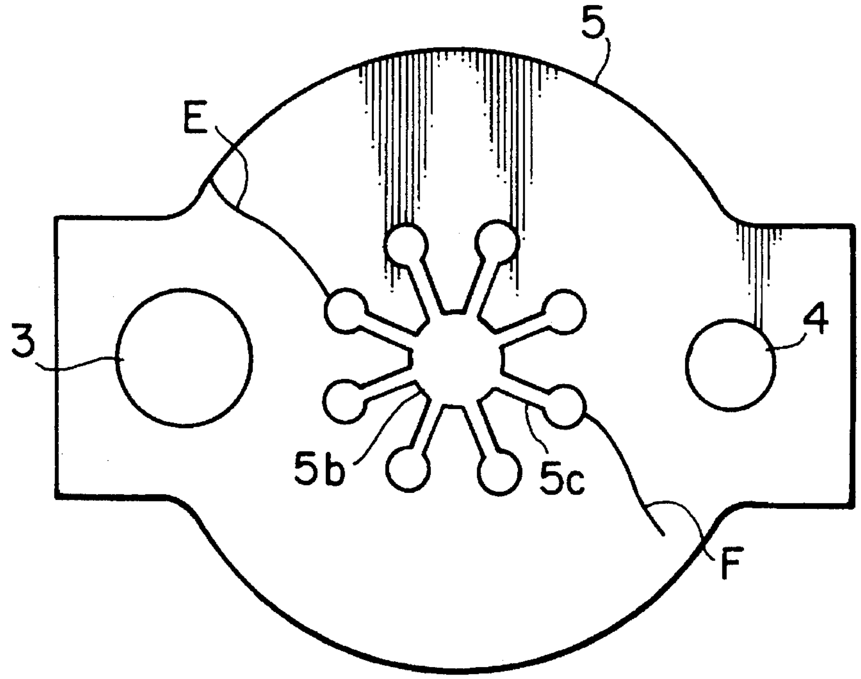
FIGS. 21–24 are plan views each showing a further embodiment of the bimetal used in the overload protective apparatus of FIG. 10 wherein the volume of the movable contacts, the area of the end portions or arrangement of slits are varied.

FIG. 21 is a plan view showing a further specific embodiment of the bimetal 5 in FIG. 10, where parts corresponding to the previously referred drawings are designated the same reference numerals.

In the specific example shown in FIG. 21, the volumes of the movable contacts 3, 4 are made different from each other. Assuming herein that the volume of the movable contact 3 is larger than that of the movable contact 4, when a large current flows therethrough, a generated heat amount is increased in the movable contact 4 having a smaller volume. For this reason, a region of the bimetal 5 to which the movable contact 4 is bonded is fused so that the movable contact 4 is more easily removed from the bimetal 5.

Figure 22:
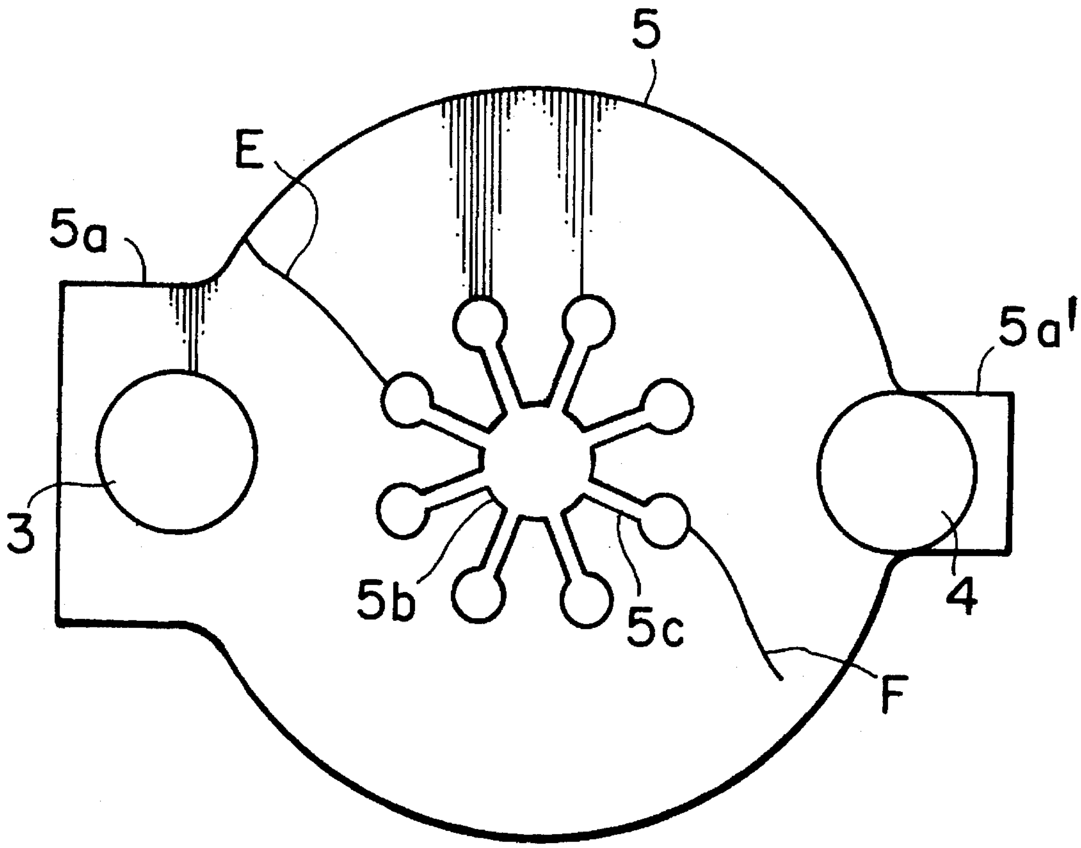

FIG. 22 is a plan view showing a further specific embodiment of the bimetal 5 in FIG. 10, where parts corresponding to the previously referred drawings are designated the same reference numerals.

In the specific example shown in FIG. 22, the movable contacts 3, 4 are secured by resistance welding on end portions 5a, 5a' of the bimetals 5, the areas of which are different from each other. Assuming herein that the movable contact 4 is bonded on the end portion 5a' of the bimetal 5 having a smaller area while the movable contact 3 is bonded on the the end portion 5a of the bimetal having a larger area, when a large current flows through the bimetal 5, a region on the end face 5' side of the bimetal 5 having a smaller area, on which the movable contact 4 is bonded, is more susceptible to a forcible rupture.

As a further specific example, the movable contacts 3, 4 may be constructed and bonded to the bimetal 5 by a similar method, but they are made of different materials, such that the movable contacts 3, 4 generate different amounts of heat from each other. For example, a silver contact exhibiting good electric conductance and thermal conductivity may be used for one of the movable contacts 3, 4, while a contact made of a combination of silver and a material exhibiting bad electric conductance and thermal conductivity such as tungsten is used for the other, thus allowing a rupture to easily occur in a region near the movable contact made of the combination of of silver and a material exhibiting bad electric conductance and thermal conductivity.

While any bimetal may be selected from those explained above for this embodiment, a bimetal may be such one that has an arbitrary combination of two or more of the heat generating means provided in the foregoing specific examples of the bimetals 5. For example, in the bimetal shown in FIG. 22, a silver contact exhibiting good electric conductance and thermal conductivity is used for the movable contact 3, while a combination of silver and a material exhibiting bad electric conductance and thermal conductivity such as tungsten is used for the movable contact 4, thereby producing more remarkable effects.

Figure 23:
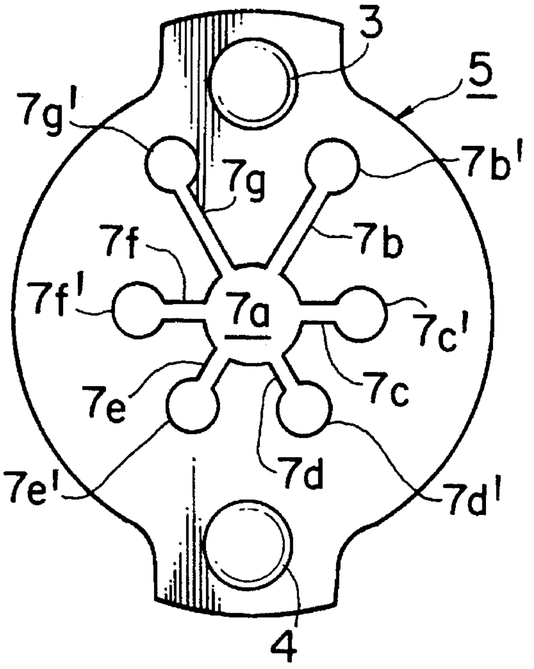

FIG. 23 shows another embodiment of the bimetal 5 which prevents degradation of the spring constant thereof and provides a larger resistance value near movable contacts.

In FIG. 23, the bimetal 5 includes six equally spaced slits 7b–7g radially extending from a supporting hole 7a located in a central portion of the bimetal 5. End portions 7b'–7g' of the slits 7b–7g are made in a circular shape. The slits 7b and 7g; 7c and 7f; 7d and 7e are symmetric with respect to a straight line connecting movable contacts 3, 4, while the slits 7c, 7f are formed in parallel with a straight line perpendicular to the straight line connecting the movable contacts 3, 4.

Referring to FIG. 23 in greater detail, the slit 7b extends slightly rightwardly with respect to the movable contact 3, while the slit 7g extends slightly leftwardly with respect to the movable contact 3. These slits 7b, 7g are identical in length and longer than the other slits 7c, 7d, 7e, 7f, and extend to the vicinity of the outer periphery of the bimetal 5. It should be noted that the slits 7c, 7d, 7e, 7f are identical in length. Thus, the width between the tips 7b', 7g' of the slits 7b, 7g and the outer periphery of the bimetal 5 (i.e., the cross-sectional area of a current path) is narrower than the width between the tips of the other slits 7c, 7d, 7e, 7f and the outer periphery of the bimetal 5 (i.e., the cross-sectional area of a current path).

As is well known in the art, stresses acting on the surrounding of the slits 7b–7g becomes maximal at the tips thereof, and stresses on the tips 7c'–7f' closer to the supporting hole 7a are larger than stresses on the tips 7b', 7g'.

Figure 24:
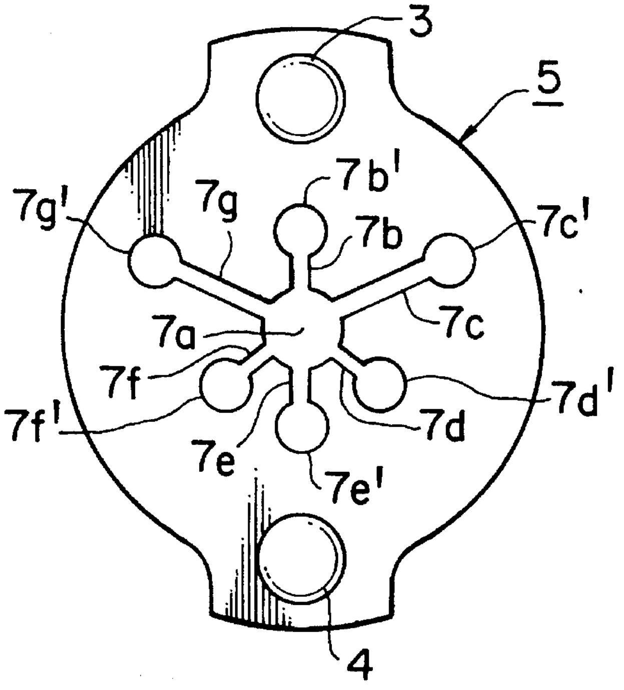

FIG. 24 is a plan view showing another specific example of the bimetal 5 in FIG. 10, where parts corresponding to those in FIG. 23 are designated the same reference numerals.

In this specific example, as shown in FIG. 24, six equally spaced slits 7b–7g extend radially from the supporting hole 7a, where the two slits 7b, 7e diametrically opposed to each other with respect to the supporting hole 7a are located on a line connecting the movable contacts 3, 4. Further, the slit 7c extending in an upper right direction and the slit 7g extending in an upper left direction reach near the outer periphery of the bimetal 5.

In the bimetal 5 constructed as described above, when a current is applied thereto, two current paths are formed outside the slits 7b–7g, through which the current from the movable contact 4 flow in two way to the movable contact 3.

When the overload protective apparatus 14 shown in FIG. 10 using the bimetal 5 as described above is employed in the electric motor 15 as illustrated in FIG. 3, in a normally rotatable state of the electric motor 15, after a large starting current has flown through the bimetal 5 and the heater line 12 for a short period of time, a small driving current continuously flows therethrough. Generally, the period of time in which the starting current flows is within approximately three seconds, which is limited by the action of the starter 16 or the like. In this event, similar to the prior art, the bimetal 5 is not lead to perform a reverse motion by a temperature rise caused by heat generating energy of the bimetal 5 and heating energy of the heater line 12.

If an excessive constraint current continuously flows through the electric motor 15, a maximum value of which is equal to the starting current, the heat generating energy of the bimetal 5 and the heating energy of the heater line 12 are increased. When the temperature of the bimetal 5 reaches a reverse motion temperature, the bimetal 5 suddenly performs a reverse motion the moment the reverse motion temperature is reached, whereby the movable contacts 3, 4 are detached from the fixed contacts 7, 8 to break a current to the electric motor 15.

After the current is broken, the bimetal 5 and the heater line 12 begin cooling down. When the temperature of the bimetal 5 reaches a storing motion temperature, the bimetal 5 performs a restoring motion to be restored to the original state the moment the restoring motion temperature is reached. If the electric motor 15 has been released from a constraint state when the bimetal is restored to the original state, the electric motor 15 starts normally operating, and the bimetal 5 will no longer performs the reverse motion. These operations are completely the same as those of the prior arts.

However, if the electric motor 15 has not been released from a constraint state when the bimetal is restored to the original state, the bimetal 5 repeats the reverse motion and restoring motion. If these motions are repeated approximately 5,000–15,000 times, the bimetal 5 will be fatigued and broken.

Figure 25:
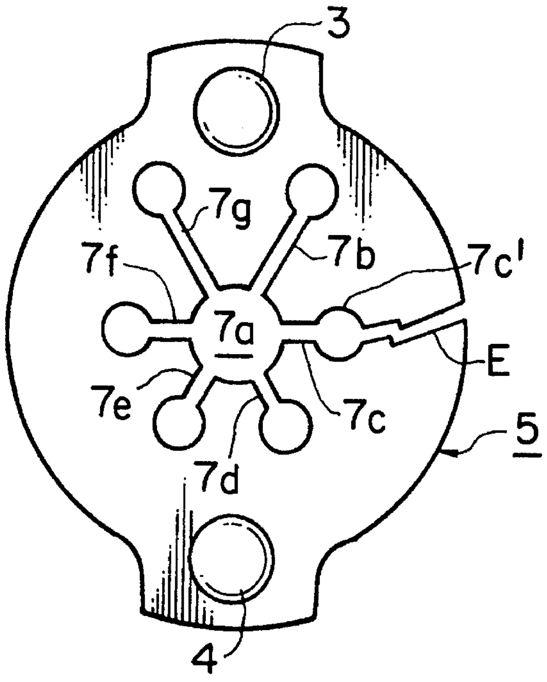
FIG. 25 shows a broken state of the bimetal illustrated in FIG. 23.

FIG. 25 shows the above stated broken state of the bimetal 5 illustrated in FIG. 23, where it is assumed that a break E has occurred between the tip 7*c*' of the slit 7*c* and the outer periphery of the bimetal 5.

Figure 26:
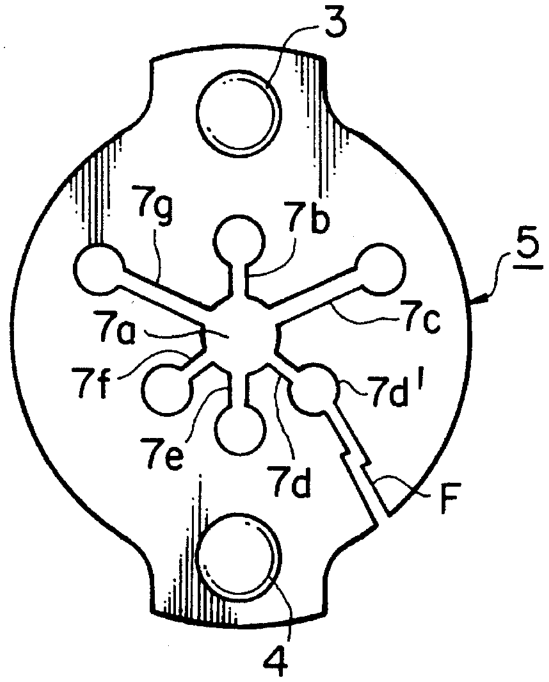
FIG. 26 shows a broken state of the bimetal illustrated in FIG. 24.

FIG. 26 shows the above stated broken state of the bimetal illustrated in FIG. 24, where it is assumed that a rupture F has occurred between the tip 7*d*' of the slit 7*d* and the outer periphery of the bimetal 5.

When a break such as E or F occurs in the bimetal 5 as described above, a current path on the right side of the slits 7*b*–7*g* on the bimetal 5 is broken, while a current path on the left side of the same remains as it is. However, the rupture causes the characteristics of the bimetal 5 to change, resulting in decreases in urging forces of the movable contacts 3, 4 to the fixed contacts 7, 8, and decreases in detaching forces of the movable contacts 3, 4 from the fixed contacts 7, 8 as well as changes in the reverse motion temperature and the restoring motion temperature of the bimetal 5. Therefore, even if the reverse motion and the restoring motion are repeated, intervals between the reverse motions are shortened due to decreased displacement amounts of the bimetal 5 near the movable contacts 3, 4 provided by the reverse motion, whereby a conduction ratio of the constraint current flowing through the bimetal 5 and the heater line 12 is increased, and consequently the temperature inside the case 1 rises more and more.

Figure 27:
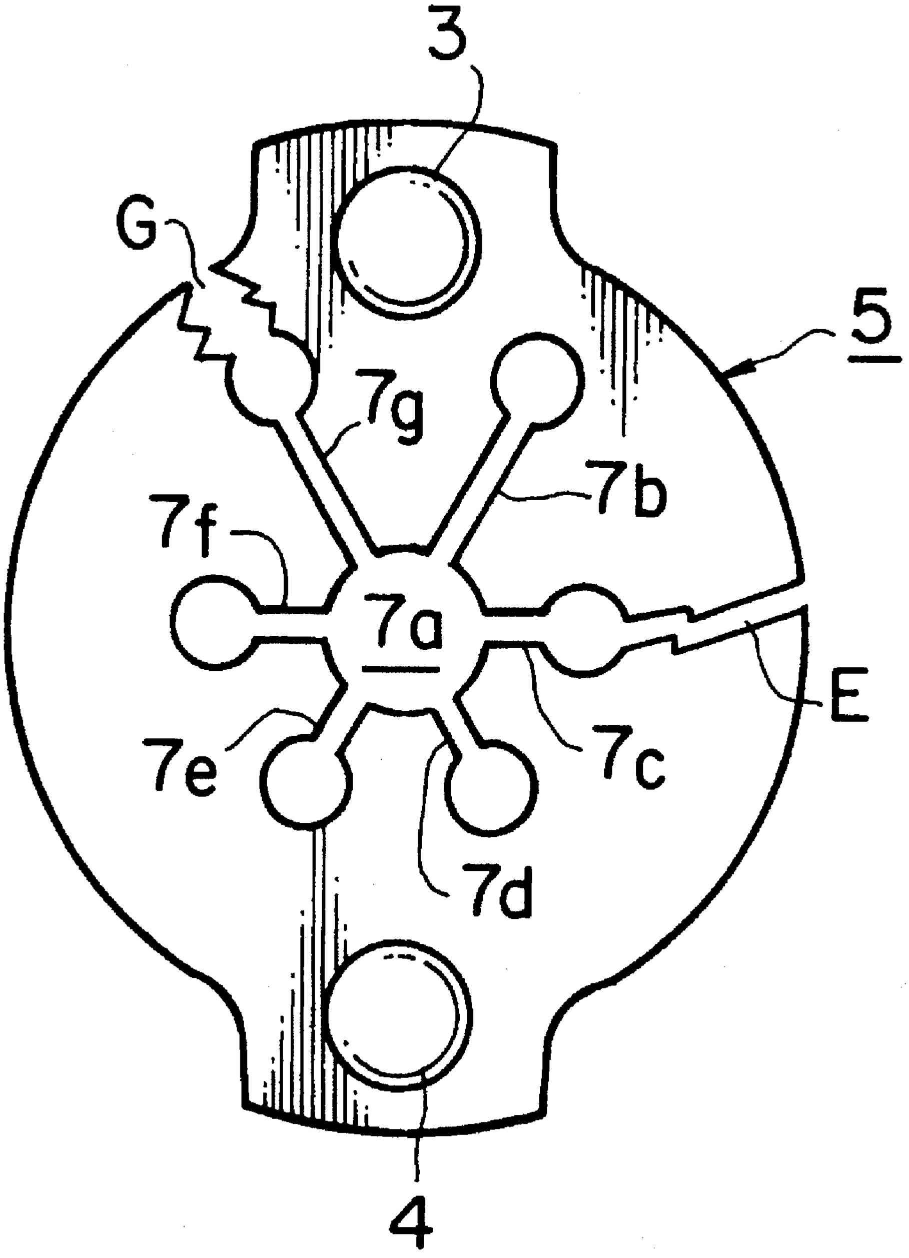
FIG. 27 shows a ruptured state of the bimetal illustrated in FIG. 23 after being broken.
Figure 28:
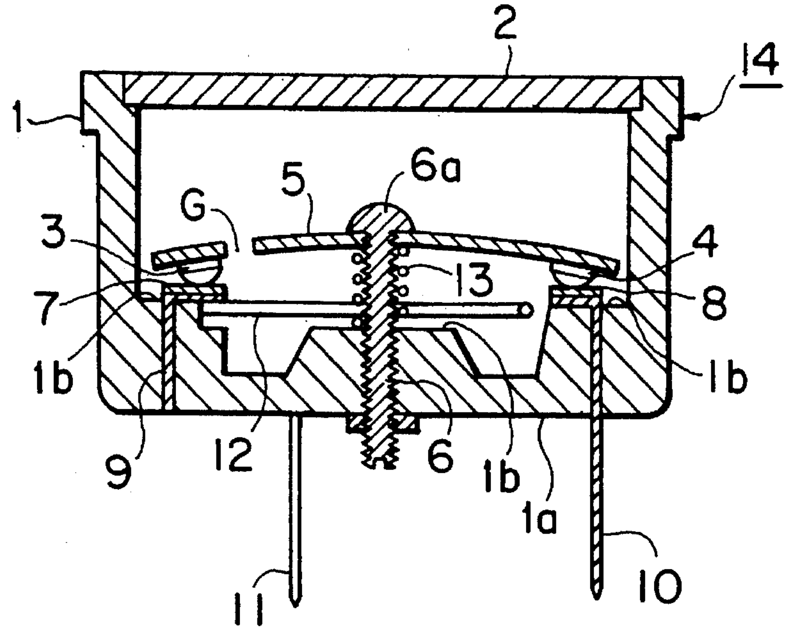
FIG. 28 shows a broken state of a current path in the embodiment illustrated in FIG. 10.

If contact deposition occurs due to such repetitive motions, a large constraint current continuously flows through a current path on the left side of the slits 7*b*–7*g* of the bimetal 5, shown in FIGS. 25 and 26, between the deposited movable contacts 3, 4. For this reason, a temperature rises significantly in a narrow portion between the tip 7*g*' of the slit 7*g* and the outer periphery of the bimetal 5 (a portion with a smaller cross-sectional area). When this temperature exceeds the melting point defined for the material of the bimetal 5, the narrow portion begins fusing, which results in a current further concentrating in the partially remaining portion. The remaining portion sequentially fuses in a chain reaction and accelerative manner, and consequently the entirety of this portion is ruptured as shown in FIG. 27. As a result, the bimetal 5 is divided between the movable contacts 3, 4 by the above stated break E or F and the ruptured portion G.

Generally, the current paths on the bimetal 5 are completely broken to interrupt a large constraint current, so that the overload protective apparatus 14 sufficiently demonstrates its function. In this event, however, the bimetal 5 has already lost its elasticity, so that it is urged upwardly by a resilient force of a spring 13. If the movable contact 4 is fortunately not deposited, this portion is also detached from the fixed contact 8, thus more reliably breaking the current path.

As described above, if the current path can be broken by the separation of any of the movable contacts 3, 4, the main purpose is achieved, so that it is not necessary to limit a position (G) at which the bimetal 5 is ruptured. For example, if a rupture G is intended to occur in a region near the movable contact 4, the slits 7*d*, 7*e* in FIG. 23, or the slits 7*d*, 7*f* in FIG. 24 may be extended to the vicinity of the outer periphery of the bimetal 5, respectively.

Figure 29:
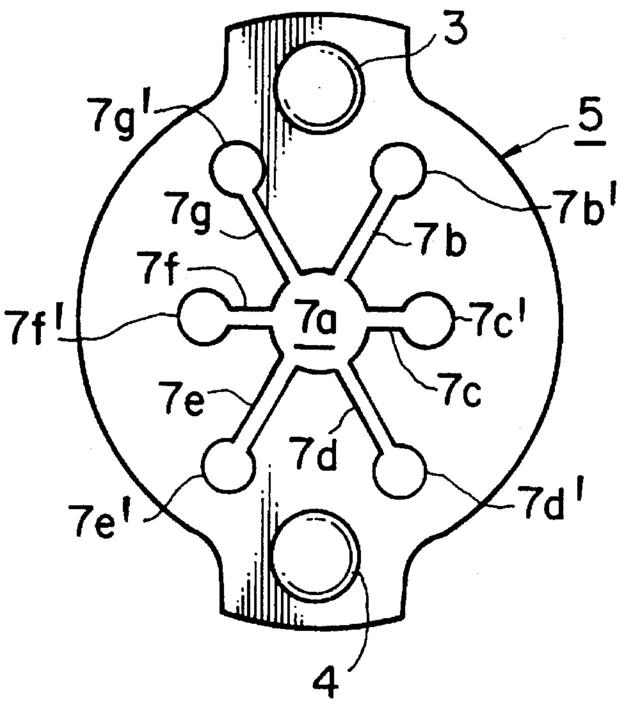
FIG. 29 is a plan view showing a further embodiment of the bimetal used in the overload protective apparatus of FIG. 10 wherein slits near the movable contacts are extended to the vicinity of the over periphery of the bimetal.

Alternatively, instead of two slits near one of the movable contacts 3, 4 as described above, each two slits near both of the movable contacts 3, 4, i.e., the slits 7*b*, 7*g* near the movable contact 3 and slits 7*d*, 7*e* near the movable contact 4 may be respectively extended to the vicinity of the outer periphery of the bimetal 5, as shown in FIG. 29.

However, if the action of the spring 13 is expected to detach the movable contact 3 or 4 from the fixed contact 7 or 8, as described above, to ensure the breakage of the current path, elongated slits are desirably provided for both of the movable contacts 3, 4 as shown in FIG. 29. This is because the contact deposition is likely to occur in either of the movable contacts 3, 4, but extremely rarely occurs simultaneously in both of them.

According to this embodiment as described above, the bimetal 5 is formed with radial slits having different lengths in accordance with using conditions, specifically, such that a rupture occurs in a predetermined location of the bimetal 5, so that the current path can be reliably broken when contact deposition occurs.

In experiments made by the inventors, for bimetals used in a relatively small current region, e.g., refrigerators and so on, i.e., TM-1 defined by JIS C2530 (volume resistivity=140 μΩ.cm at 20° C.) and TM-2 (volume resistivity=80 μΩ.cm at 20° C.), and bimetals used in a relatively large current region, e.g., air conditioners and so on, i.e., TM-6 (volume resistivity =20–50 μΩ.cm at 20° C.), a variety of materials having thicknesses of 0.15 mm, 0.18 mm and 0.20 mm were prepared and subjected to the experiments, and it was revealed as a result that the degree of influence of the radial throughholes on a temperature rise by local heat generation can be expressed by the following equation:

$$\Delta T=0.241^2RT/MC$$

where, assuming, for example, in the bimetal 5 shown in FIG. 23, that a region between the slits 7*b*', 7*g*' and the outer periphery of the bimetal 5 in which a rupture is intended to occur is referred to as a rupture intended region, ΔT: temperature rise in the rupture intended region (20 C.)

I: current flowing through the rupture intended region (A)

R: resistance of the rupture intended region (Ω)

T: time during which the current flows through the rupture intended region (sec)

M: influencing mass of the rupture intended region 5*e* (g)

C: specific heat (cal/g/° C.)

According to the above equation, when the cross-sectional area of a current path in the rupture intended region is one half as much as the cross-sectional area of a current path in another region between the tips of the other slits and the outer periphery of the bimetal 5, the mass of the rupture intended region is also reduced to one half, whereby the resistance R of the same is doubled. As a result, a temperature rise in the rupture intended region appears as a four-multiplied change, and accordingly a time required for the temperature to reach the same temperature is reduced to a quarter. Stated another way, with the same current, a rupture will occur in the rupture intended region in a time period shorter by a factor of four than in the other regions. Thus, by appropriately setting the cross-sectional area of a current path in a rupture intended region by forming slits, arbitrary rupture conditions can be established.

In this embodiment, the bimetal 5 has an appropriate area near the movable contact 3, for example, as can be seen between the slits **7*b*, 7*g* in FIG. 23, to maintain the spring constant, thus avoiding a disadvantage of providing the bimetal 5** with a larger adjustment margin, as is required in the prior art.

Also, elongated radial slits for defining a rupture intended region are subjected to smaller stresses than the other slits, so that no break will start from these slits. As a result, the overload protective apparatus 14, particularly for turning a large current on and off, has advantages of improved reliability and so on.

Further, by the action of the elongated radial slits for defining a rupture intended region, when the bimetal 5 performs a restoring motion, mechanical vibrations (chattering and bouncing) produced when the movable contacts 3, 4 are brought into contact with the fixed contacts 7, 8 are absorbed, thus prolonging the life of the bimetal 5. Conversely, if the overload protective apparatus with the elongated radial throughholes is designed to have the same life as conventional one, contact volumes can be reduced, which can correspondingly decrease the first cost thereof. It will be appreciated that the formation of the elongated radial throughholes through the bimetal 5 results in producing a number of effects.

According to this embodiment as described above, a variety of bimetals having different characteristics can be easily produced irrespective of the magnitude of a load current.

Figure 30:
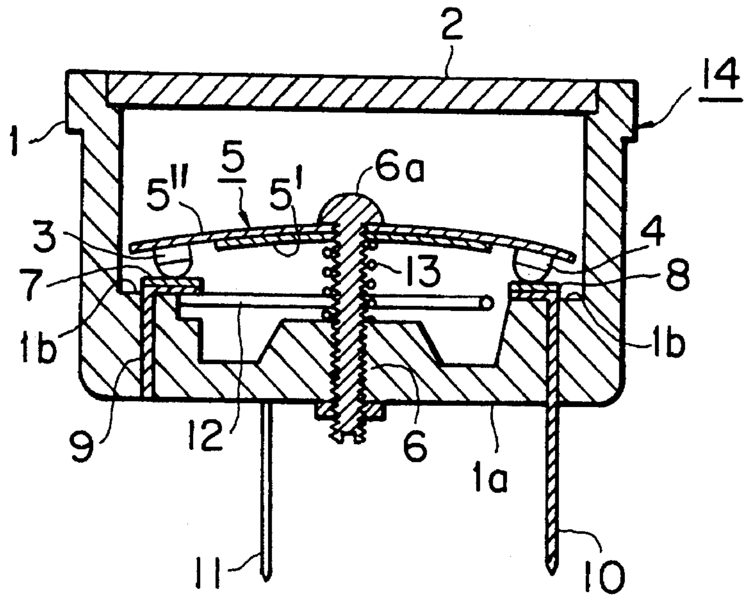
FIG. 30 is a longitudinal sectional view showing a further embodiment of an overload protective apparatus according to the present invention including a bimetal having only a low expansion metal in regions near the movable contacts.

FIG. 30 is a longitudinal sectional view showing the overload protective apparatus according to another embodiment of the present invention which additionally includes a high-expansion metal 5' and a low-expansion metal 5". Other parts corresponding to those in FIG. 10 are designated the same reference numerals, and repetitive explanation thereon will be omitted.

In FIG. 30, a bimetal 5 is formed in a two-layer structure consisting of the high-expansion metal 5' bonded with the low-expansion metal 5", where the high-expansion metal 5' is the upper layer while the low-expansion metal 5" is the lower layer. Regions near movable contacts 3, 4 of the bimetal 5 consists only of the low-expansion metal 5", so that the movable contacts are secured on the lower surface of the low-expansion metal 5" by resistance welding.

When the temperature of the bimetal 5 is low, the high-expansion metal 5' is in a contracted state so that the bimetal 5 is upwardly projecting in an arcuate form, wherein the movable contacts 3, 4 are in contact with fixed contacts 7, 8. On the contrary, when the temperature of the bimetal 5 is high, the high-expansion metal 5' largely expands to bring the bimetal 5 into a downwardly projecting arcuate form, whereby the movable contacts 3, 4 are detached from the fixed contacts 7, 8.

Figure 31:
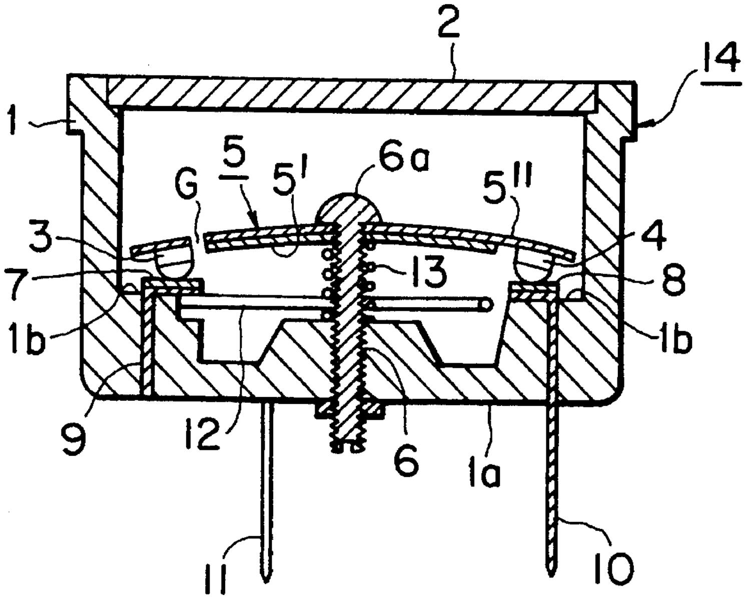
FIG. 31 shows a broken state of a current path in the embodiment illustrated in FIG. 30.

With the structure described above, when contact deposition occurs, the current density becomes highest only in regions of the low-expansion metal 5" around bonding portions for the movable contacts 3, 4, one of these regions fuses, and the bimetal 5 is ruptured as indicated by G in FIG. 31. In this manner, the movable contact 3 deposited on the fixed contact 7 is separated from the bimetal 5, thereby ensuring that the current path falls into a broken state. In this manner, similar effects can be produced also by this embodiment.

Figure 32:
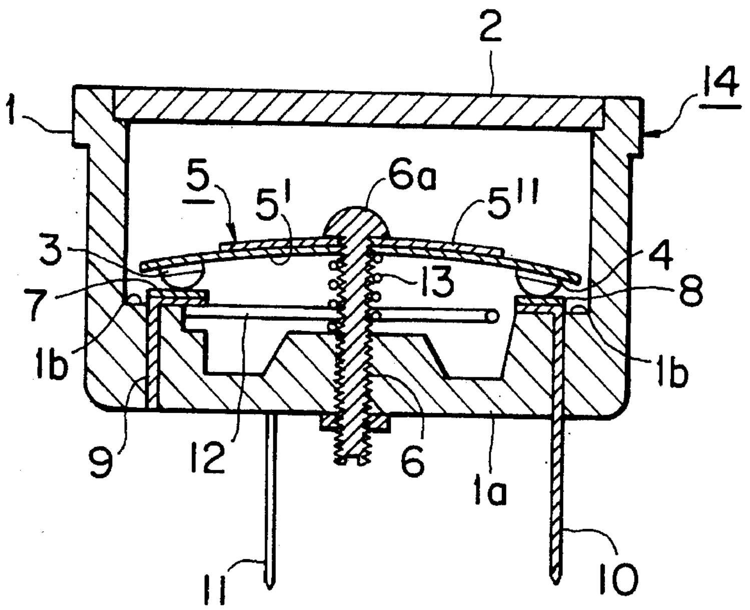
FIG. 32 is a longitudinal sectional view showing a further embodiment of an overload protective apparatus according to the present invention including a bimetal having only a high expansion metal in regions near the movable contacts.

FIG. 32 is a longitudinal sectional view showing the overload protective apparatus according to a further embodiment of the present invention, where parts corresponding to those in FIG. 30 are designated the same reference numerals.

In this embodiment as shown in FIG. 32, a bimetal 5 is formed in a two-layer structure consisting of a high-expansion metal 5' and a low-expansion metal 5" bonded thereto, where the high-expansion metal 5' is a lower layer while the low-expansion metal 5" is an upper layer. The bimetal 5, however, has regions around bonding portions for movable contacts 3, 4 consisting only of the high-expansion metal 5'. In other words, the movable contacts 3, 4 are secured on the lower surface of the high-expansion metal 5' by resistance welding.

Figure 33:
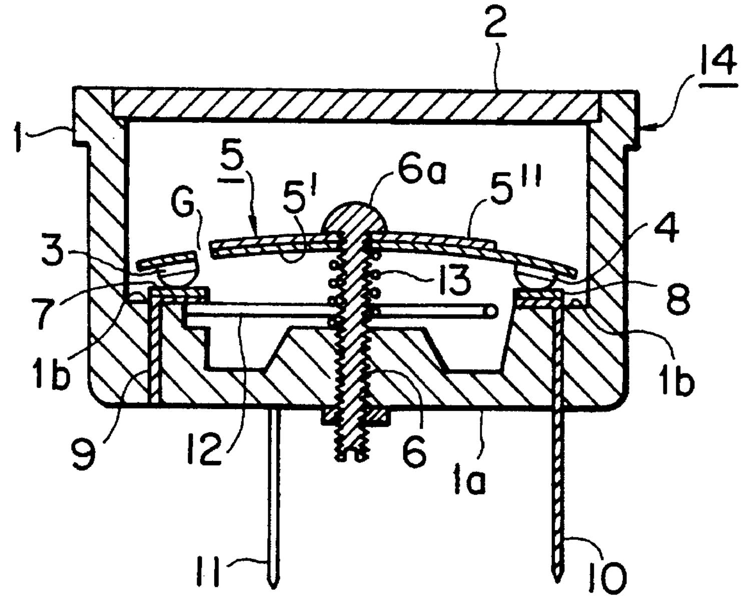
FIG. 33 shows a broken state of a current path in the embodiment illustrated in FIG. 32.

With the structure described above, assuming that a contact deposition occurs on the movable contact 3 side as shown in FIG. 33, a rupture G arises in the high-expansion metal 5' around the bonding portion for the movable contact 3, whereby the movable contact 3 is separated from the bimetal 5, similarly to the previous embodiment, to break the current path.

Figure 34A:
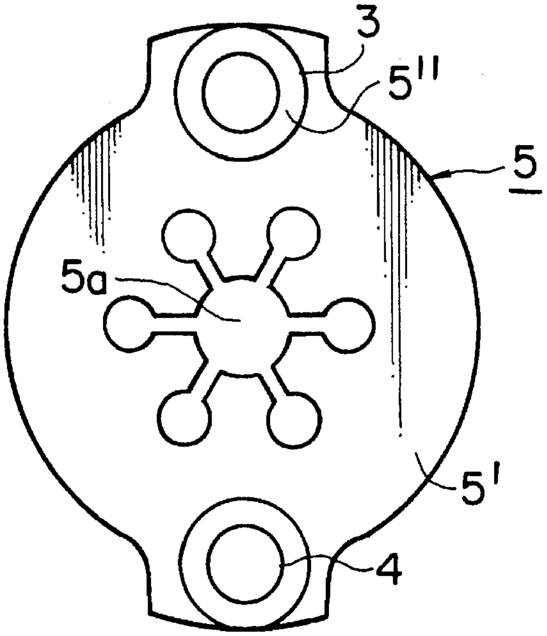
FIGS. 34A, 34B show specific examples of bimetals illustrated in FIGS. 30, 32, respectively.
Figure 34B:
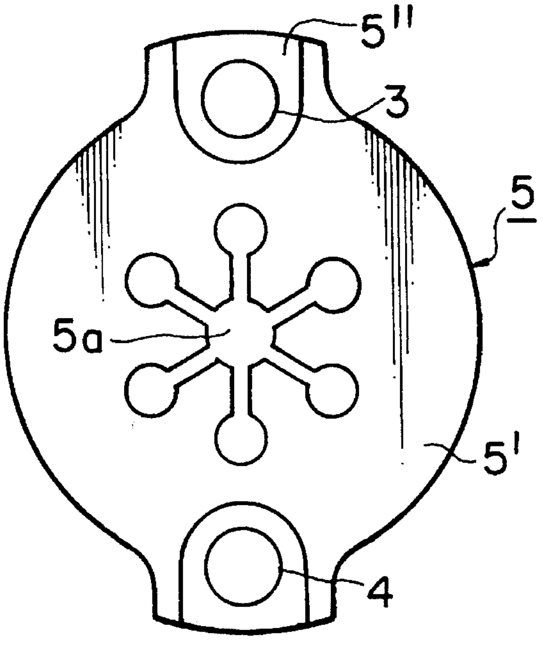

FIGS. 34A, 34B are plan views respectively showing a specific example of the bimetal 5 illustrated in FIG. 30, where parts corresponding to those in FIG. 30 are designated the same reference numerals.

The bimetal 5 shown in FIG. 34A has the high-expansion metal 5' removed around the movable contacts 3, 4 in an annular form, and the bimetal 5 shown in FIG. 34B has the high-expansion metal 5' removed around the movable contacts 3, 4 and up to the ends of the bimetal 5. To produce these bimetals 5, the high-expansion metal 5' may first be bonded with the low-expansion metal 5", and then the high-expansion metal 5' may be removed around the movable contacts 3, 4 by machining or the like. Alternatively, the high-expansion metal 5' may have regions round the movable contacts 3, 4 previously removed by blanking prior to bonding, and thereafter the blanked high-expansion metal 5' may be bonded with the low-expansion metal 5". Since the bimetal 5 produced by either of the above methods has a partial single-layer structure around the movable contacts 3, 4, it can prevent contact pressures from largely decreasing.

It is noted that the bimetal 5 shown in FIG. 32 is constructed in a similar manner.

Figure 35:
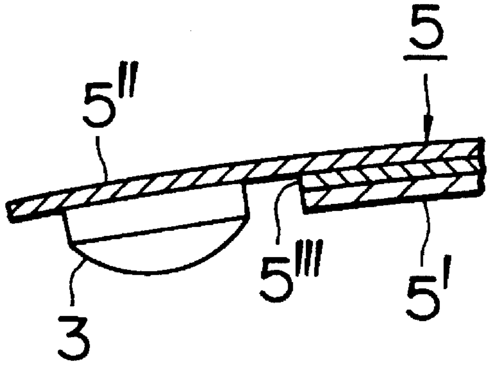
FIG. 35 is a side view of a movable contact portion showing a further embodiment of a three layered polymetallic element used in the overload protective apparatus of FIG. 10.

FIG. 35 is a cross-sectional view showing a main portion of a bimetal for use in the overload protective apparatus according to a further embodiment of the present invention. Newly added herein is an intermediate layer metal 5'". Other parts corresponding to those in the previously referred drawings are designated the same reference numerals.

As shown in FIG. 35, this embodiment comprises a polymetallic element 5 formed in a multi-layer structure in which a high-expansion metal 5', the intermediate layer metal 5'", and a low-expansion metal 5" are bonded in this order. Similarly to the embodiments shown in FIGS. 30, 32, the high-expansion metal 5' is a lower layer, the low-expansion metal 5" is an upper layer, and the intermediate layer metal 5'" is interposed between these two layers. Around bonding portions for movable contacts 3, 4, the high-expansion metal 5' and the intermediate layer metal 5'" are removed so that the movable contacts 3, 4 are secured on the lower surface of the low-expansion metal 5" by resistance welding.

Also in this embodiment, similarly to the foregoing embodiments, a rupture is most likely to occur in the bonding portion around the movable contact 3 or 4 having a cross-sectional area smaller than the multilayer structure region.

Figure 36:
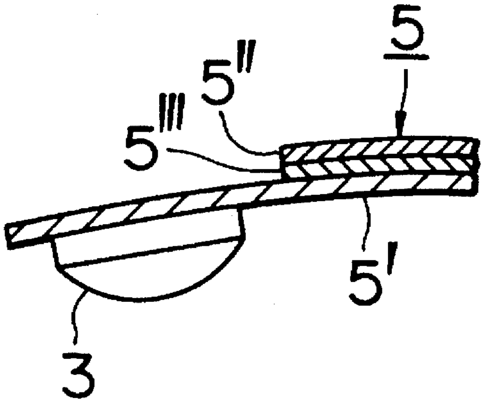
FIG. 36 is a side view of a movable contact portion showing a further embodiment of the three layered polymetallic element used in the overload protective apparatus of FIG. 10.

FIG. 36 is a cross-sectional view showing a main portion of a polymetallic element for use in the overload protective apparatus according to a further embodiment of the present invention, where parts corresponding to those in FIG. 35 are designated the same reference numerals.

In this embodiment as shown in FIG. 36, a polymetallic element 5 is formed in a multi-layer structure in which a high-expansion metal 5', an intermediate layer metal 5''', and a low-expansion metal 5'' are bonded, where the high-expansion metal 5' is a lower layer, the low-expansion metal 5'' is an upper layer, and the intermediate layer metal 5''' is interposed between these two layers, similarly to the embodiment shown in FIG. 35. However, unlike FIG. 35, the low-expansion metal 5'' and the intermediate layer metal 5''' are removed around bonding portions for the movable contacts 3, 4, and the movable contacts 3, 4 are secured on the lower surface of the high-expansion metal 5' by resistance welding.

It is appreciated also in this embodiment that a rupture is most likely to occur around the bonding portion for the movable contact 3 or 4 having a cross-sectional area smaller than the multi-layer structure region.

Figure 37:
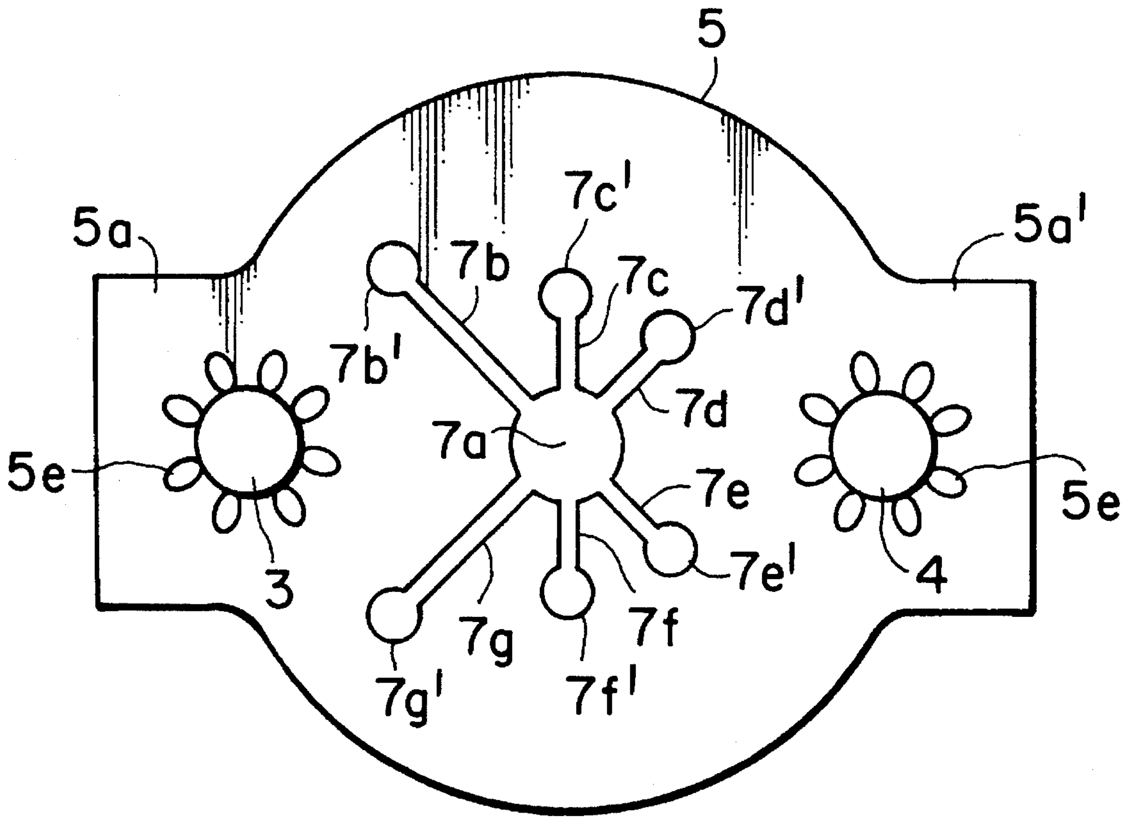
FIG. 37 is a plan view showing a further embodiment of the bimetal used in the overload protective apparatus of FIG. 10 combining the constructions shown in FIGS. 11 and 23.

While the present invention has been described in connection with embodiments thereof, it should be understood that the present invention is not limited only to such embodiments. For example, the polymetallic element 5 may be constructed by an optional combination of the above described embodiments. Specifically, the structure of FIG. 11 may be combined with the structure of FIG. 23 to provide a structure as shown in FIG. 37. Also, the structure of FIG. 23 may be combined with the structure of FIG. 30.

In the bimetal used in the embodiment shown in FIG. 23, while the number of slits may be appropriately selected, it is preferable that slits are positioned symmetrically with respect to the straight line connecting the movable contacts 3, 4, in order to equal amounts of currents which may flow through the two current paths divided by the slits.

It will be appreciated from the foregoing that according to the present invention, a variety of polymetallic elements having different characteristics can be easily produced irrespective of the magnitude of a load current.

Figure 38:
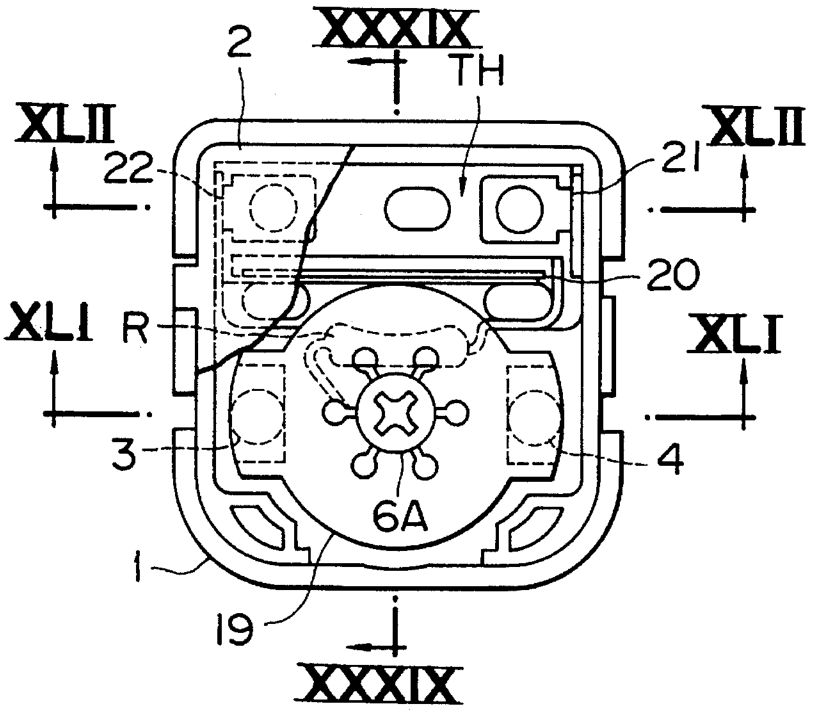
FIG. 38 is a plan view showing the inside of a two element type overload protective apparatus according to a further embodiment of the present invention.
Figure 39:
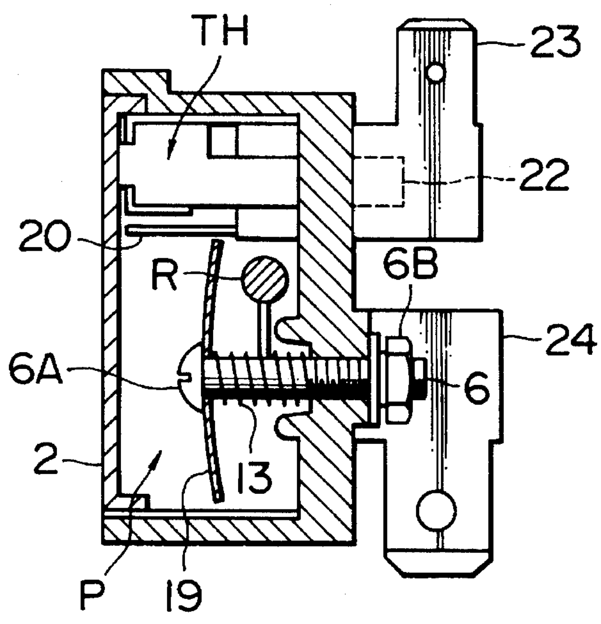
FIG. 39 is a longitudinal sectional view of the overload protective apparatus of FIG. 38 taken from the parting line A—A.
Figure 40:
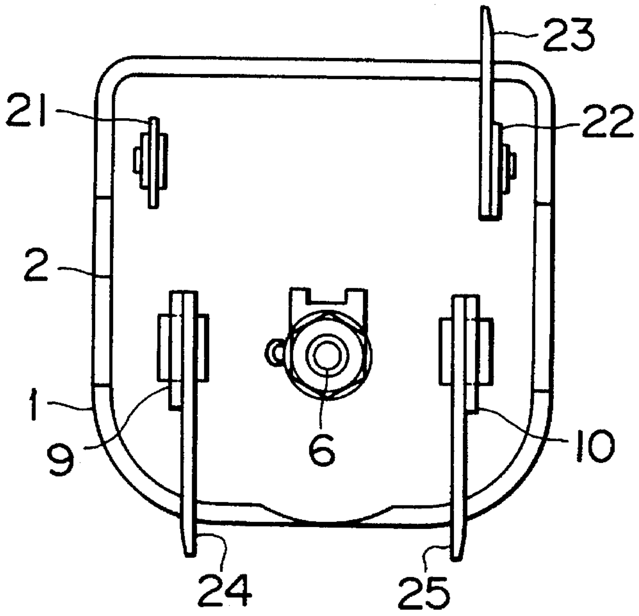
FIG. 40 is a back view of the embodiment shown in FIG. 38.
Figure 41:
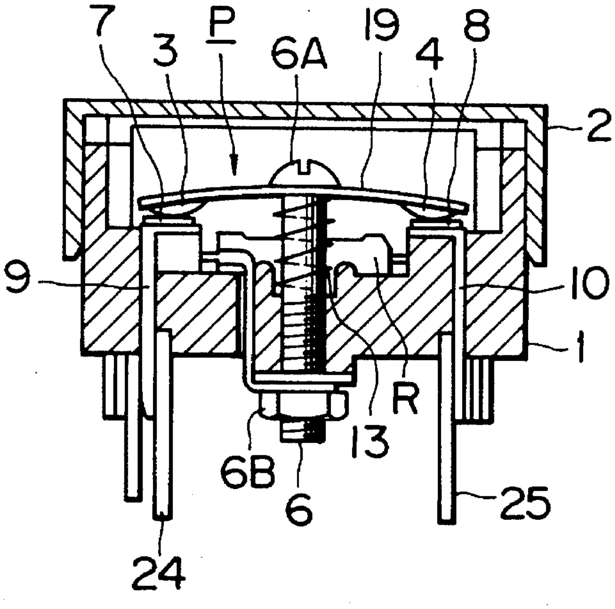
FIG. 41 is a longitudinal sectional view of the overload protective apparatus of FIG. 38 taken from the parting line B—B.

FIGS. 38–42 shows the structure of an embodiment of an overload protective apparatus as a two-element type thermal protector according to the present invention. FIG. 38 shows a plan view of the inside thereof; FIG. 39 a cross-sectional view taken from the parting line XXXIX—XXXIX in FIG. 38; FIG. 40 a back view taken from the opposite side of FIG. 38; FIG. 41 a cross-sectional view taken from the parting line XLI—XLI in FIG. 38; and FIG. 42 a cross-sectional view taken from the parting line XLII—XLII in FIG. 38. The two-element type thermal protector includes a case 1; a lid 2; movable contacts 3, 4; an adjusting bolt 6; a head 6A of the adjusting bolt 6; a nut 6B; fixed contacts 7, 8; fixed terminal plates 9, 10; a compression spring 13; a main bimetal 19; a separator 20; terminals 21, 22; tab terminals 23, 24, 25; a bimetal 26; a movable contact 27; a fixed contact 28; supporting members 29, 30; a conductor plate 31; a contact piece 32; a main protector P; a heater R; and a temperature switch TH.

In FIGS. 38–42, the case 1 is made of an insurant material and formed in a rectangular sleeve with one end being opened. The lid 2 is fitted into the open end of the case 1 to form an internal space. As is apparent from FIGS. 38, 39, this internal space is divided into a chamber for accommodating the main protector P and another chamber for accommodating the temperature switch TH, where the separator made, for example, of unwoven fabric or the like is arranged on a boundary therebetween to insulate the main protector P and the temperature switch TH from each other.

Explaining first the main protector P, as is apparent from FIGS. 38, 39, 41, the dish-shaped main bimetal 19 is mounted to the adjusting bolt 6 which penetrates a through-hole formed through the bottom of the case 1 and has a lower end portion screwed by the nut 6B on the external bottom face 1*a* of the case 1. Further, the compression spring 7 is fitted on the adjusting bolt 6 between the bimetal 19 and the internal bottom face of the case 1. The nut 6B is fastened by a predetermined amount such that the main bimetal 19 is urged to the head 6A of the adjustment bolt 6 by a resilient force of the compression spring 13 generated by fastening the nut 6B, whereby the main bimetal 19 is spaced apart by a predetermined distance from the internal bottom face of the case 1. In this structure, the bimetal 19 is mounted to the adjusting bolt 6 with its concave face being oriented to the bottom of the case 1.

As is apparent from FIGS. 38 and 39, in a space between the bimetal 19 and the internal bottom face of the case 1, the heater R is disposed on the separator 20 side with respect to the adjusting bolt 6. The heater R is not limited to its available range and may be a resistor such as a carbon film resistor, metal film resistor, carbon resistor, a wire wound resister, or the like, or any material such as nickel-chrome alloy, nickel-chrome-iron ally, iron-chrome-aluminum alloy, silicon carbide, copper-nickel alloy, copper alloy, or the like, as long as it can serve as a heat source when applied with a current. When the heater R is disposed within a region equal to the projected area of the main bimetal 19 on the internal bottom face of the case 1, less heat is lost when the main bimetal 19 is heated, thereby improving the responsibility of the main bimetal 19.

As shown in FIG. 41, on outer peripheral portions of the concave face of the main bimetal 19, movable contacts 3, 4 are placed on both sides of the adjusting bolt 6 in the direction along the parting line B—B in FIG. 38, i.e., in parallel with the direction in which the heater R is disposed. The fixed terminal plates 10, 9 extend through peripheral portions of the bottom wall of the case 1 and fixed on the internal bottom face of the case 1. Each of the fixed contacts 7, 8 formed on one end of the fixed terminal plate 9 or 10 is fixed on the internal bottom face of the case 1 opposite to the movable contact 3 or 4 secured on the main bimetal 19. The other ends of the fixed terminal plates 10, 9 outwardly project through the bottom wall of the case 1, as shown in FIGS. 39, 40, and the tab terminals 24, 25 are secured on the projecting portions of the fixed terminal plates 9, 10, respectively.

The main protector P is constructed as described above. Next, the structure of the temperature switch TH will be explained with reference to FIG. 42.

Figure 42:
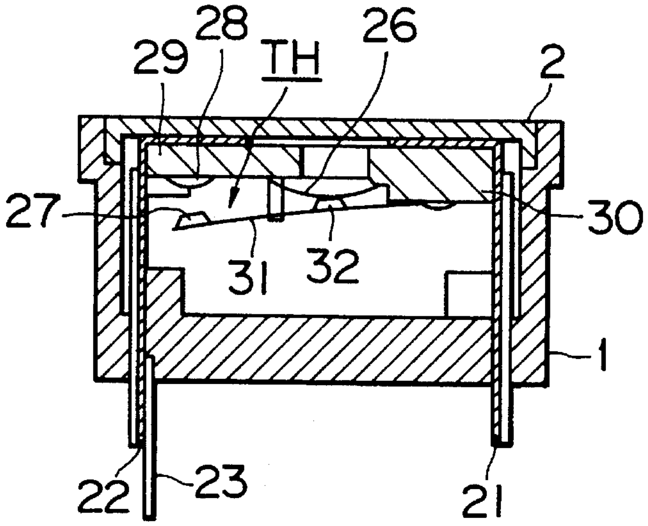
FIG. 42 is a longitudinal sectional view of the overload protective apparatus of FIG. 38 taken from the parting line C—C.

As is apparent from FIG. 42, two insulating supporting members 30, 29 are disposed so as to partially sandwich the terminals 21, 22 together with the internal surface of the lid 2. One end of the conductor plate 31 having elasticity is secured on the supporting member 30. This end is electrically connected with the terminal 21 by a means, not shown. On the other end of the conductor plate 31, the movable contact 27 is mounted on the surface opposite to the lid 2. The fixed contact 28 is disposed on the supporting member 29 at a position opposite to the movable contact 27 on the conductor plate 31. The fixed contact 28 is also electrically connected with the terminal 22 by a means, not shown. Further, the contact piece 32 is protrusively disposed substantially in a central portion on the surface of the conductor plate 31 opposite to the lid 2, such that the projecting surface of the arcuately deflected bimetal 26, having its ends attached to the supporting members 29, 30, abuts the contact piece 32 on the conductor plate 31. In general, the bimetal 26 is largely deflected to urge the conductor plate 31 such that the movable contact 27 is detached from the fixed contact 28.

The terminals 21, 22 outwardly project through the bottom wall of the case 1, similarly to the fixed terminal plates 10, 9 of the main protector P (FIG. 40). The tab terminal 23 is secured on the terminal 22.

The temperature switch TH is constructed as described above. In the structures of the main protector P and the temperature switch TH as explained above, the main bimetal 19 and bimetal 26 are largely deflected in a normal state, so that the movable contacts, 3, 4 secured on the main bimetal 19 are in contact with the fixed contacts 7, 8 on the fixed terminal plates 9, 10, respectively, while the movable contact 27 secured on the conductor plate 31 is prevented from contacting with the fixed contact 28 on the supporting member 29. For this reason, the tab terminals 24, 25 are electrically connected through the fixed terminal plates 10, 9 and the main bimetal 19, while the temperature switch TH remains off so that the current path between the terminals 21, 22 or 23 is opened. It should be noted that the main bimetal 19 and the bimetal 26 present less deflected amounts as an ambient temperature rises.

Here, an end portion of the terminal 21 inside the case 1 is connected to one terminal of the heater R placed near the main bimetal 19. The tab terminal 23 secured on an end portion of the terminal 22 projecting outwardly from the case 1 is connected to an electric motor and a power supply terminal. The other terminal of the heater R is connected to a central portion of the bimetal 19 through the adjusting bolt 6 in the main protector P.

Figure 43:
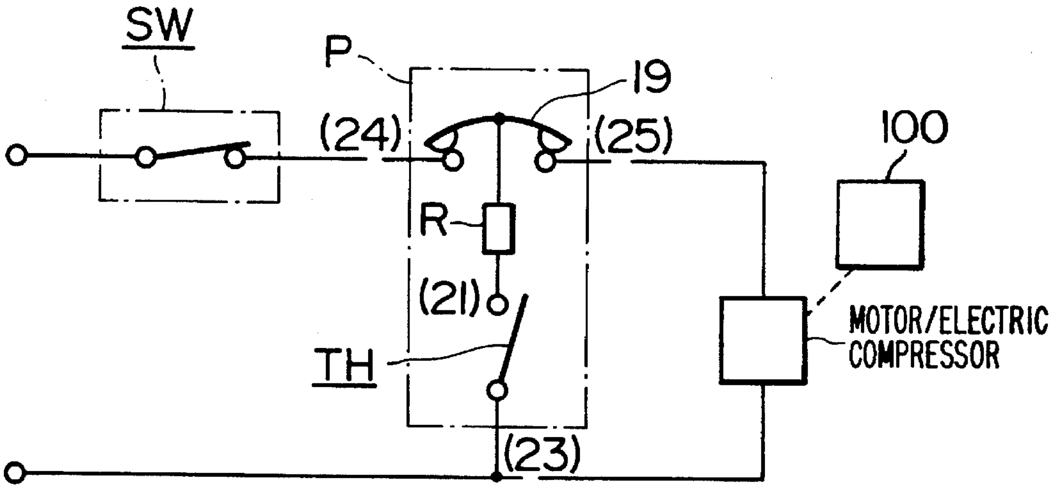
FIG. 43 is an electric circuit diagram of a machine which employs the embodiment illustrated in FIG. 38.

FIG. 43 is a connection diagram showing a circuit including the two-element type thermal protector of the above structure which is connected between an electric motor and a power supply, where parts corresponding to those in the previously referred drawings are designated the same reference numerals.

Referring to FIG. 43 in detail, the movable contact 3 is connected to one terminal of an electric motor M which drives a compressor or load 100 through the fixed terminal plate 10 and the tab terminal 25, while the movable contact 3 is connected to a power supply terminal, not shown, through the fixed terminal plate 9, tab terminal 24, and a power supply switch SW. In other words, the main bimetal 19 is connected between the power supply terminal and the one terminal of the electric motor M. The heater R in turn has one terminal connected in series with the temperature switch TH through the terminal 21 and the other terminal connected to the main bimetal 19. The temperature switch TH is connected to the power supply terminal as well as to the other terminal of the electric motor M through the terminal 22 and the tab terminal 23. Thus, a series circuit comprising the heater R and the temperature switch TH is connected in parallel with the electric motor M.

Figure 44:
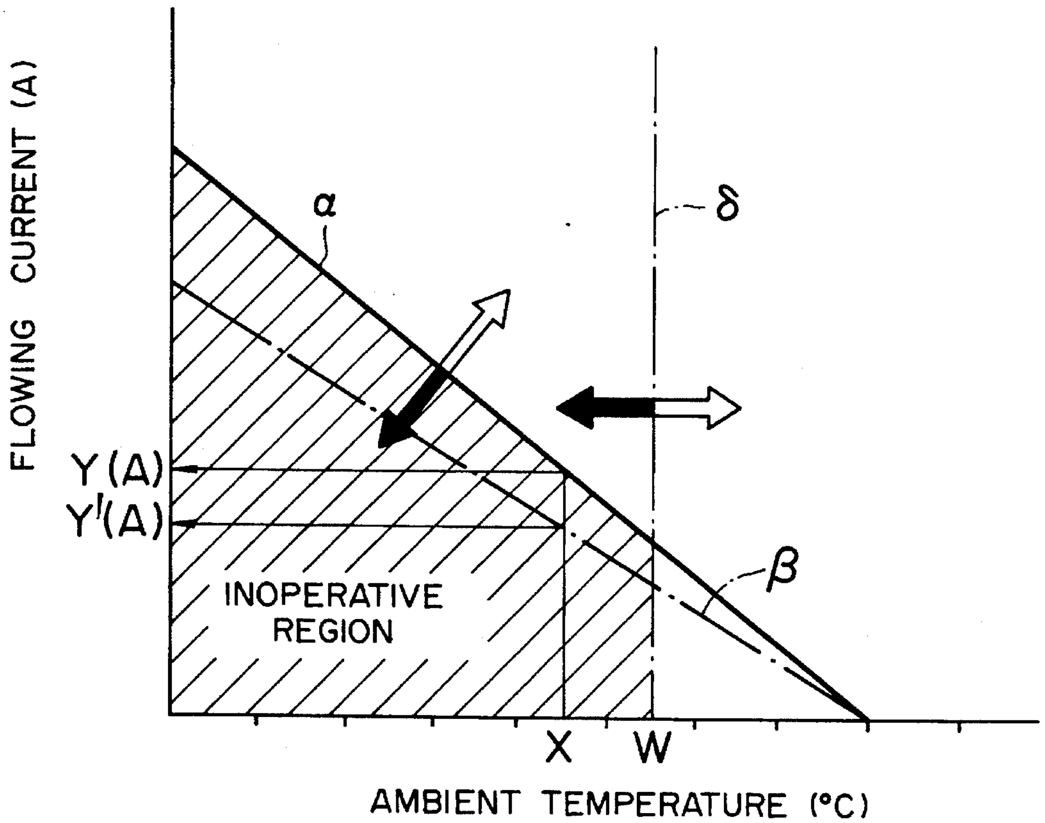
FIG. 44 is a graph showing the operating characteristics of the embodiment illustrated in FIG. 38.

FIG. 44 shows the operating characteristic and non-operating characteristic of the foregoing two-element type thermal protector when used as illustrated in FIG. 43, where the abscissa represents an ambient temperature around the two-element type thermal protector, and the ordinate a current flowing through the main bimetal 19 in the two-element type thermal protector.

In FIG. 44, a solid line a indicates the operating characteristic of the main bimetal 19 disposed in the main protector P. A hatched region below the solid line a represents an inoperative region, and a blank region above the solid line a an operative region. A one-dot chain line d representing an ambient temperature W (° C.) indicates the operating characteristic of the temperature switch TH. A region on the left of the one-dot chain line d (indicated by a black arrow) represents an inoperative region, while a region on the right thereof (indicated by a white arrow) an operative region. The one-dot chain line d also represents the operating characteristic of the main bimetal 19 after the temperature switch TH has operated.

According to the graph shown in FIG. 44, a combined inoperative region in which neither current nor temperature causes the two-element type thermal protector to operate is defined by the hatched region, and all the remaining region may be regarded as an operative region of the two-element type thermal protector. For example, a boundary current at an ambient temperature X (° C.) which defines operative and inoperative conditions for the main protector P is Y (A), where the main protector P remains in an inoperative state if a current flowing therethrough is below Y (A), while a current above Y (A) causes the main protector P to become in an operative state. After the temperature switch TH has operated, the main protector P is in the inoperative state with a current below Y' (A) flowing therethrough, and becomes in the operative state with a current above Y' (A).

Therefore, if the electric motor M is applied with an excessively large current compared with a regular current due to an overload, constrained rotor, or the like, the main bimetal 19 generates heat which causes the main bimetal 19 to perform a reverse motion, so that the movable contacts 3, 4 are detached from the fixed contacts 7, 8, respectively to break a current to the electric motor M, thus preventing the electric motor M from being overheated and damaged.

Figure 45A:
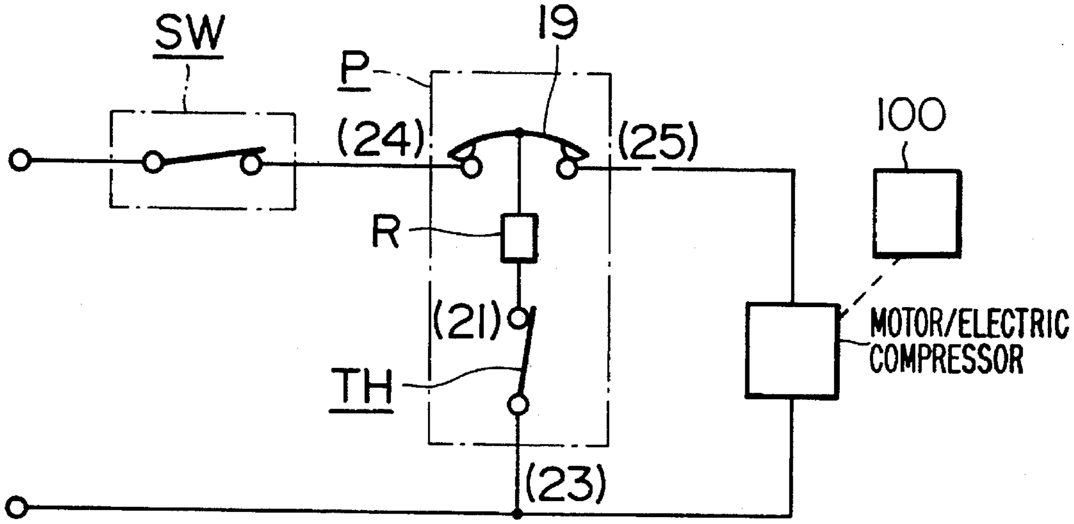
FIGS. 45A, 45B are electric circuit diagrams for explaining circuit operations of the embodiment shown in FIG. 38.
Figure 45B:
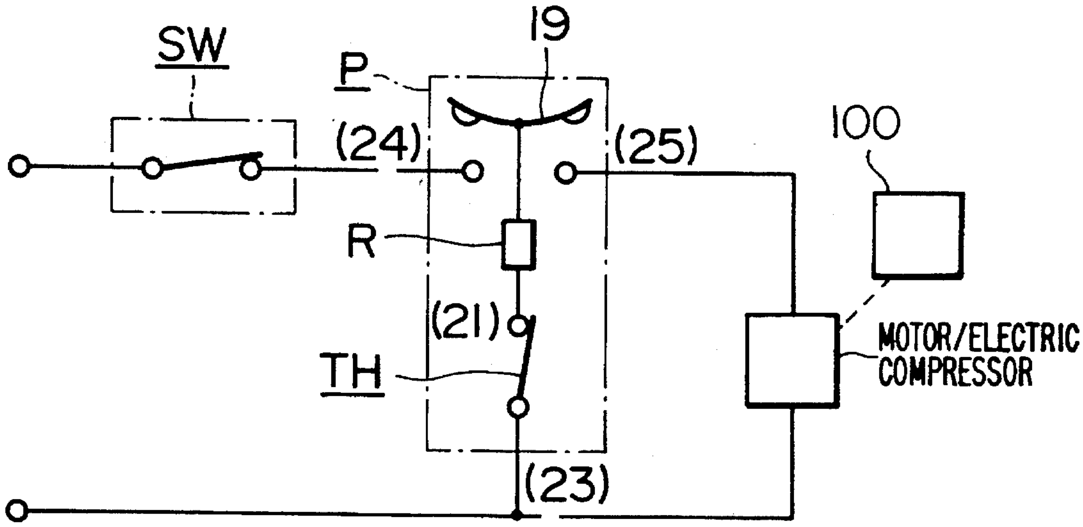

In case a current flowing through the main bimetal 19 does not increase because of a leaked coolant or the like, and a temperature rise in the case 1 only is detected, the temperature switch TH is closed at the predetermined temperature W (° C.) as shown in FIG. 45A to apply the heater R with a current to heat the main bimetal 19. As a result, the main bimetal 19 performs a reverse motion to detach the movable contacts 3, 4 from the fixed contacts 7, 8, thus breaking the current flowing through the electric motor M to prevent the same from being overheated and damaged.

When the main bimetal 19 performs a reverse motion, since one terminal of the heater R is connected to the adjusting bolt 6, a closed circuit including the electric motor M, temperature switch TH and heater R is opened, and a majority of a surge voltage generated when the circuit including the electric motor M is opened appears as arc between the opened contacts, whereby energy of the surge voltage is consumed. Thus, the temperature switch TH and the heater R are not applied with a large surge voltage.

In this manner, the temperature switch TH and the heater R in this embodiment are protected from a surge voltage, so that a compact and cheap heater can be employed as the heater R.

Figure 46A:
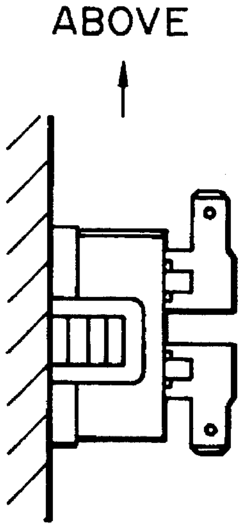
FIGS. 46A, 46B each show how the overload protective apparatus illustrated in FIG. 38 is mounted to a machine which uses it.
Figure 46B:
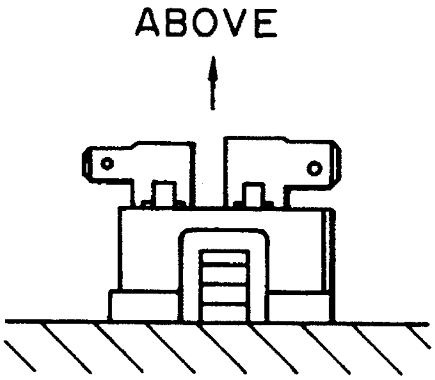

Also, the two-element thermal protector of this embodiment may be mounted on either a vertical surface or a horizontal surface of an outer shell of an electric motor for driving a compressor, as shown in FIGS. 46A, 46B. That is, the protection characteristic is not affected by a mounting direction thereof.

Therefore, the overvoltage characteristic required to the heater R is sufficient if a commercial power supply voltage is satisfied, so that a compact and cheap heater may arbitrarily be selected to this end, resulting in improving a thermal response.

Moreover, since the heater R can maintain stable performance over a long period of time, this embodiment employing such the heater R improves the reliability and prolongs the life as the two-element type thermal protector.

Since the temperature switch TH is not either applied with a surge voltage, a large spacing is not required between the contacts of the temperature switch TH, which results in permitting the use of a compact and cheap temperature switch excellent in operation responsibility.

Incidentally, a thermo-responsive switch may be employed as the temperature switch TH. This kind of thermo-responsive switch improves the operation sensitivity as the spacing between contacts is shorter.

As described above, the two-element type thermal protector according to this embodiment can be mounted to any closed type compressor or electric motor so as to be responsible to any characteristics as well as a variety of loads. Further, since a highly reliable protector can be easily provided at a low cost, a large value will be expected in utilizing the protector.

Figure 47:
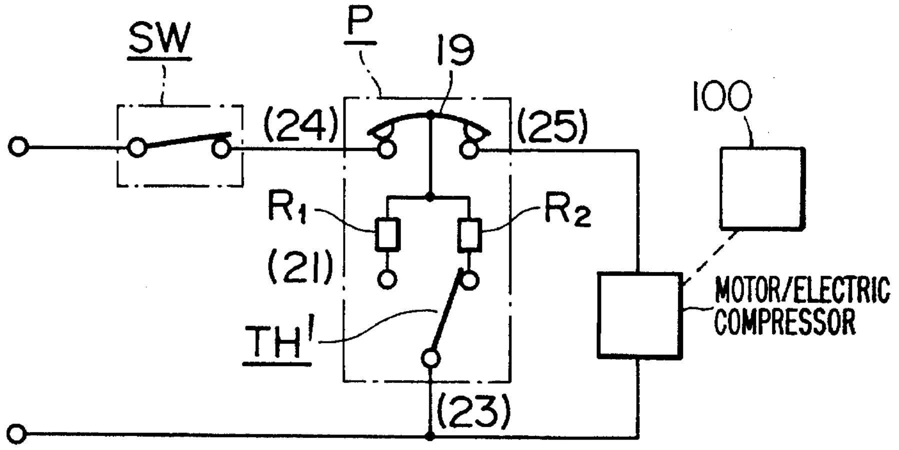
FIG. 47 is an electric circuit diagram showing a used state of another embodiment of an overload protective apparatus according to the present invention.

FIG. 47 is a connection diagram showing an electric circuit of an overload protective apparatus, when in use, according to another embodiment of the present invention as a two-element type thermal protection. Newly added herein are heaters R1, R2 and a temperature switch TH'. Other parts corresponding to those in FIG. 45A are designated the same reference numerals.

This embodiment is modified to allow a current to be continuously applied to the heaters in order to raise an ambient temperature around a main bimetal 19 even in a region where the main bimetal 19 cannot perform a reverse motion only with self-generating heat energy thereof in the previously explained embodiments.

In FIG. 47, the temperature switch TH' is a single-pole double-throw switch which has one terminal regularly opened and the other terminal regularly closed, in contract with the temperature switch TH in FIG. 42 which is a single-pole single-throw switch having a regularly opened terminal. The regularly opened terminal of the temperature switch TH' is connected with the heater R1, while the regularly closed terminal is connected with the heater R2 which generates a smaller amount of heat than the heater R1. These heaters R1, R2 are placed opposite to the main bimetal 19 in a region substantially equal to the projected area of the main bimetal 19 (FIGS. 38 and 39) on the internal bottom face of the case 1, whereby heat loss is reduced when the main bimetal 19 is heated, thus improving the responsibility of the main bimetal 19.

Figure 48:
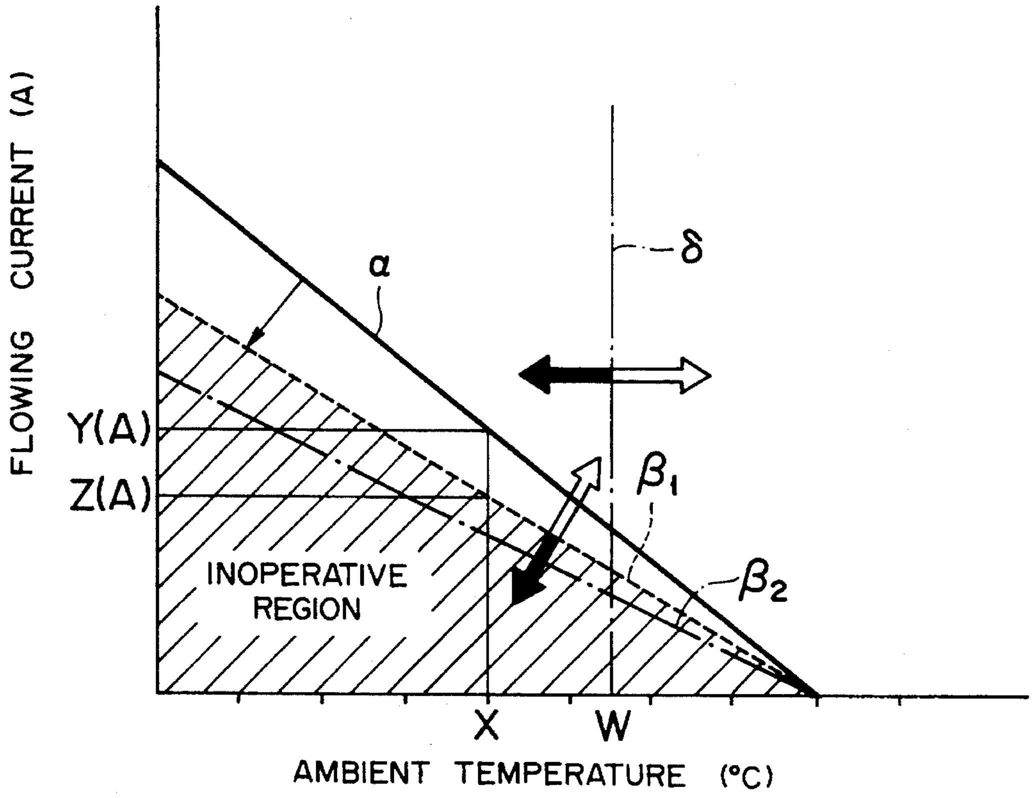
FIG. 48 is a graph showing the operating characteristics of the embodiment illustrated in FIG. 47.

FIG. 48 shows operating characteristics and non-operating characteristics of the present embodiment when used as illustrated in FIG. 47. In FIG. 48, the abscissa represents an ambient temperature around the two-element type thermal protector, and the ordinate a current flowing through the main bimetal 19.

In FIG. 48, a solid line a indicates the operating characteristic and non-operating characteristic obtained when the main bimetal 19 alone is used, while a broken line bl indicates apparent operating characteristic and non-operating characteristic of the main bimetal 19 when heat generated by the heater R2 is applied thereto. More specifically, the heat generating energy of the heater R2 causes the ambient temperature around the main bimetal 19 to rise, which facilitates the main bimetal 19 to operate even if heat generating energy of the main bimetal 19 is short by the energy generated by the heater R2 for performing a reverse motion. Stated another way, a current with which the main bimetal 19 can operate may arbitrarily be shifted by changing the ambient temperature around the main bimetal 19. Therefore, with the help of the heater R2, a current at an operating point of the main bimetal 19 can be shifted to a lower value.

For example, if the ambient temperature around the bimetal 19 is X (° C.), a boundary current defining an operative region and an inoperative region of the main bimetal 19 is indicated at Y(A) on the characteristic represented by the solid line α, and at Z(A) on the characteristic represented by the broken line β. Thus, the main bimetal 19 is in an inoperative state when a current less than Y(A) or Z(A) is passing therethrough while it is in an operative state when a current more than Y(A) or Z(A) is passing therethrough. It will be appreciated in FIG. 48 that the characteristic represented by the broken line β1 indicates the actual operating characteristic of the main protector P, where a hatched region below the broken line β1 represents an inoperative region, and a region without hatching represents an operative region.

As described above, even if a steady-state current flowing through the electric motor M is not sufficient to allow the main bimetal 19 to operate, the electric motor M can be provided with a proper two-element type thermal protector which utilizes the heating effect of the heater R2. As a result, if an excessively large current, compared with the steady-state current, is to flow into the electric motor M due to an overload, a constrained rotor, or the like, the main bimetal 19 generates heat, performs a reverse motion to detach the movable contacts 2, 4 from the fixed contacts 7, 8, respectively, thus breaking the current to protect the electric motor M from being overheated and damaged.

Also, in FIG. 48, a one-dot chain line b2 indicates the operating characteristic of the main bimetal 19 when the temperature switch TH' selects the heater R1 (FIG. 47), where a hatched region below the one-dot chain line β2 represents an inoperative region, and a region above the same represents an operative region, respectively. As a result, the inoperative region of the two-element type thermal protector, in which neither current nor temperature causes the two-element type thermal protector to operate, is expressed by a region below β1 or below β2 depending on the selected heater R1 or R2.

Figure 49A:
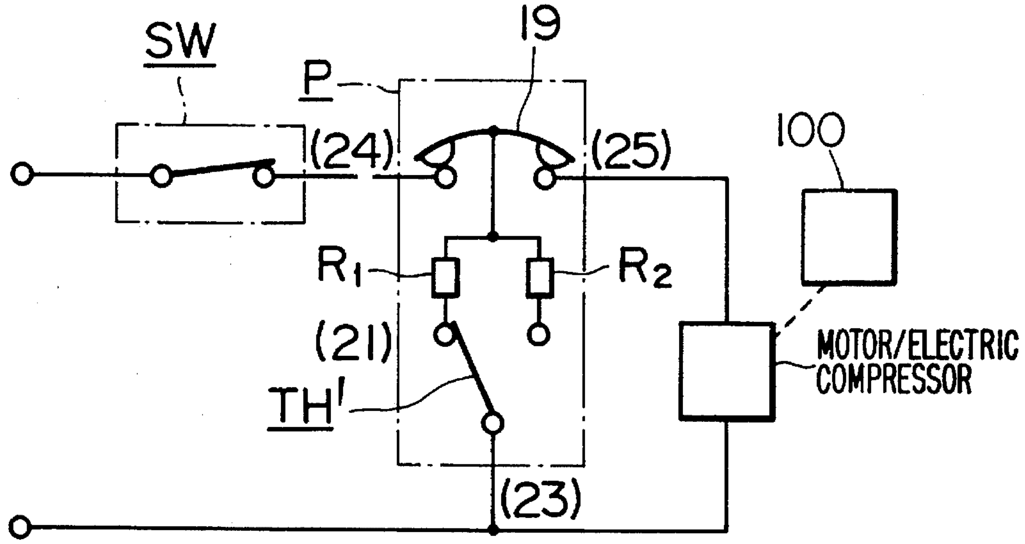
FIGS. 49A, 49B are electric circuit diagrams for explaining circuit operations of the embodiment shown in FIG. 47.
Figure 49B:
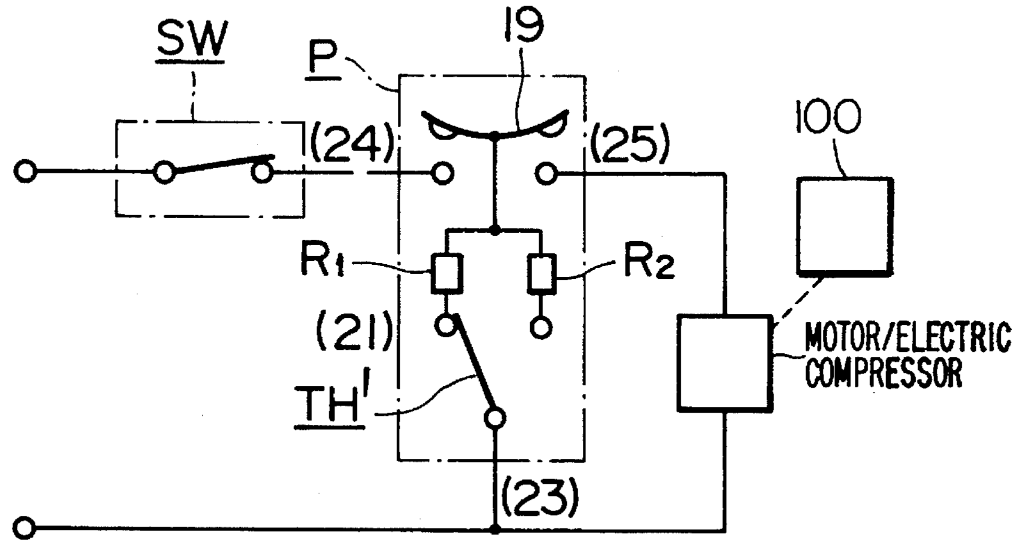

Therefore, in case a leak of a coolant or the like occurs to raise the temperature in the case 1 without causing a current to increase, the temperature switch TH' moves to the other terminal at a predetermined temperature W (° C.) as shown in FIG. 49A to break a current to the heater R2 and instead begin applying the heater R1 with the current. For this reason, the heater R1 releases a larger amount of heat energy to rapidly heat the main bimetal 19. As a result, the main bimetal 19 performs a reverse motion, as shown in FIG. 49B, to detach the movable contacts 3, 4 from the fixed contacts 3, 4, respectively, thus breaking the current to the electric motor M to protect the same from being overheated and damaged.

When the main bimetal 19 performs the reverse motion as described above, one terminal of each of the heaters R1, R2 is connected to the adjusting bolt 6, so that a closed circuit including the electric motor M, temperature switch TH, and heater R is opened. Thus, energy of a surge voltage generated when the current path of the electric motor M is opened is mostly consumed as arc between opening and closing contacts, whereby the temperature switch TH and heaters R1, R2 are free from the surge voltage, similarly to the previously. explained embodiment.

Preferably, the thickness of the bimetal 5 explained in the respective embodiments described above is within a range from 0.15 mm to 0.25 mm.

The overload protective apparatus according to the present invention may be connected with and used for an electric compressor in an air conditioner, refrigerator, dehumidifier, and so on.

We claim:

1. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has a plurality of throughholes around bonding portions for said movable contacts.

2. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case wherein, said polymetallic element has elongated throughholes each extending across a central portion of a mounted position of each of said movable contacts, and said each movable contact is bonded to said polymetallic element so as to step over said each elongated throughhole.

3. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic has conical protrusions on each of which each of said movable contacts is bonded.

4. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has end portions for bonding said movable contacts, wherein at least one of said end portions has a width substantially equal to the diameter of said movable contacts.

5. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic at a position separate from the bottom of said case, said polymetallic element and said adjusting bolt being accommodated in said case, wherein, said polymetallic element has a plurality of slits extending radially from a central portion of said polymetallic element, wherein at least one pair of slits among said plurality of slits positioned opposite to each other with respect to a straight line connecting said movable contacts are formed longer than the other slits.

6. An overload protective apparatus according to claim 5, wherein said polymetallic element further has a plurality of throughholes around bonding portions for said movable contacts.

7. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has movable contacts made of different materials from each other.

8. An overload protective apparatus according to claim 7, wherein said movable contacts have electric conductances or thermal conductivities different from each other.

9. An overload protective apparatus according to claim 8, wherein one of said movable contacts is made of silver, and the other is made of a metal including silver and tungsten.

10. An overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has a multi-layered structure constituted of two kinds of metals having different expansion coefficients from each other and an intermediate metal sandwiched by said two kinds of metals, and regions for bonding said movable contacts are each constituted of a single-layer structure comprising one of said two kinds of metals having different expansion coefficients from each other.

11. An overload protective apparatus comprising a main protector having fixed contacts connected to at least one pair of fixed terminals secured on the bottom of a case, a dish-shaped polymetallic element having movable contacts bonded thereon so as to oppose said fixed contacts, an adjusting bolt supporting a central portion of said polymetallic element for maintaining said polymetallic element at a position separate from the bottom of said case, and a heater located near said polymetallic element, and a temperature switch operable at a predetermined temperature, said main protector and said temperature switch being accommodated in said case, wherein, said heater has one terminal connected to said temperature switch and the other terminal connected to said polymetallic element through said adjusting bolt, and wherein said heater has first and second heaters having different heat generating amounts from each other, said first and second heaters being selectively switched by said temperature switch in accordance with an ambient temperature.

12. A combination of an electric compressor and an overload protective apparatus, said overload protective apparatus having fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has a plurality of throughholes around bonding portions for said movable contacts, and wherein said overload protective apparatus is in a current path of the electric compressor.

13. An overload protective apparatus according to claim 1, 2, 3, 4, 5, 7, 10 or 11, wherein said polymetallic element is a bimetal.

14. A combination of an electric compressor and an overload protective apparatus, an overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has elongated throughholes each extending across a central portion of a mounted position of each of said movable contacts, and said each movable contact is bonded to said polymetallic element so as to step over said each elongated throughhole, and wherein said overload protective apparatus is in a current path of the electric compressor.

15. A combination of an electric compressor and an overload protective apparatus, an overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic element at a position separate from the bottom of said case, said polymetallic element and said adjusting bolt being accommodated in said case, wherein, said polymetallic element has end portions for bonding said movable contacts, wherein at least one of said end portions has a width substantially equal to the diameter of said movable contacts, and wherein said overload protective apparatus is in a current path of the electric compressor.

16. A combination of an electric compressor and an overload protective apparatus, an overload protective apparatus having fixed contacts connected to at least one pair of fixed terminals secured on the bottom of a case, a dish-shaped polymetallic element having movable contacts bonded thereon so as to oppose said fixed contacts, and an adjusting bolt supporting a central portion of said polymetallic element for maintaining said polymetallic at a position separate from the bottom of said case, said polymetallic element and said adjusting bolt being accommodated in said case, wherein, said polymetallic element has a plurality of slits extending radially from a central portion of said polymetallic element, wherein at least one pair of slits among said plurality of slits positioned opposite to each other with respect to a straight line connecting said movable contacts are formed longer than the other slits, and wherein said overload protective apparatus is in a current path of the electric compressor.

* * * * *